United States Patent
Macfarlane et al.

(10) Patent No.: US 12,552,942 B2
(45) Date of Patent: Feb. 17, 2026

(54) COMPOSITIONS, ARTICLES, AND METHODS INVOLVING POLYMER GRAFTED PARTICLES

(71) Applicant: Massachusetts Institute of Technology, Cambridge, MA (US)

(72) Inventors: Robert J. Macfarlane, Cambridge, MA (US); Joshua Kubiak, Somerville, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 825 days.

(21) Appl. No.: 17/833,644

(22) Filed: Jun. 6, 2022

(65) Prior Publication Data

US 2023/0076513 A1 Mar. 9, 2023

Related U.S. Application Data

(60) Provisional application No. 63/270,012, filed on Oct. 20, 2021, provisional application No. 63/230,374, filed on Aug. 6, 2021.

(51) Int. Cl.
*C09C 1/30* (2006.01)
*C09C 1/40* (2006.01)

(52) U.S. Cl.
CPC ............ *C09C 1/3072* (2013.01); *C09C 1/407* (2013.01)

(58) Field of Classification Search
CPC ........ C01P 2004/64; C09J 11/09; C09J 7/385; C09J 11/04

USPC ........................................................ 523/216
See application file for complete search history.

(56) References Cited

U.S. PATENT DOCUMENTS

| | | | |
|---|---|---|---|
| 2013/0005856 A1* | 1/2013 | Phonthammachai | C08K 3/36 977/773 |
| 2013/0157041 A1* | 6/2013 | Hsin | F28F 21/02 977/734 |
| 2017/0335075 A1* | 11/2017 | Bicerano | C08K 3/36 |
| 2023/0079151 A1 | 3/2023 | MacFarlane et al. | |

OTHER PUBLICATIONS

Domènech et al., Strong macroscale supercrystalline structures by 3D printing combined with self-assembly of ceramic functionalized nanoparticles. Adv Eng Mater. 2020; 22: 2000352.
Dreyer et al., Organically linked iron oxide nanoparticle supercrystals with exceptional isotropic mechanical properties. Nat Mater. May 2016;15(5):522-8.
Kubiak et al., Forming covalent crosslinks between polymer# grafted nanoparticles as a route to highly filled and mechanically robust nanocomposites. Adv Funct Mater. Nov. 2019; 29 (44): 1905168.
Kubiak et al., Polymer grafted nanoparticles as a single component, high filler content composites via simple transformative aging. Adv Funct Mater. 2022; 32(6): 2107139.

* cited by examiner

*Primary Examiner* — Hannah J Pak
(74) *Attorney, Agent, or Firm* — Wolf, Greenfield & Sacks, P.C.

(57) ABSTRACT

Composites comprising polymer grafted particles that are capable of forming interparticle interactions, and related methods, are generally described.

13 Claims, 34 Drawing Sheets

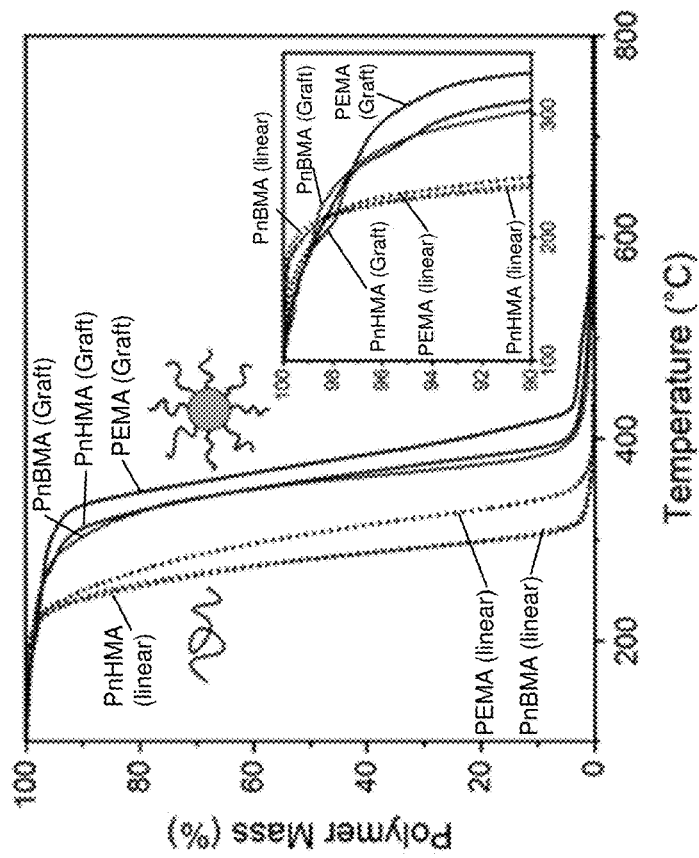
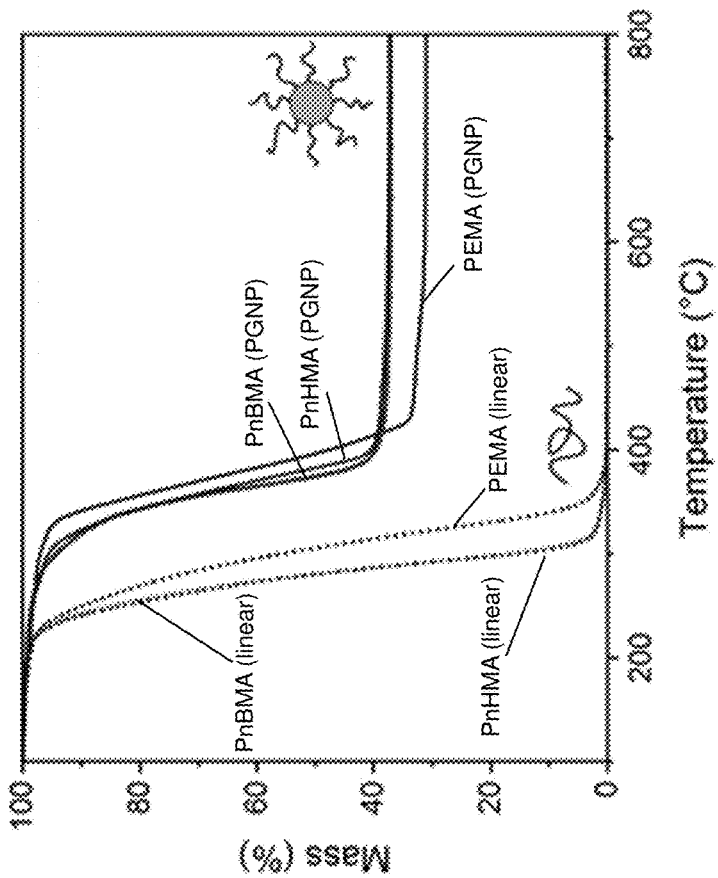
FIG. 6A
FIG. 6B

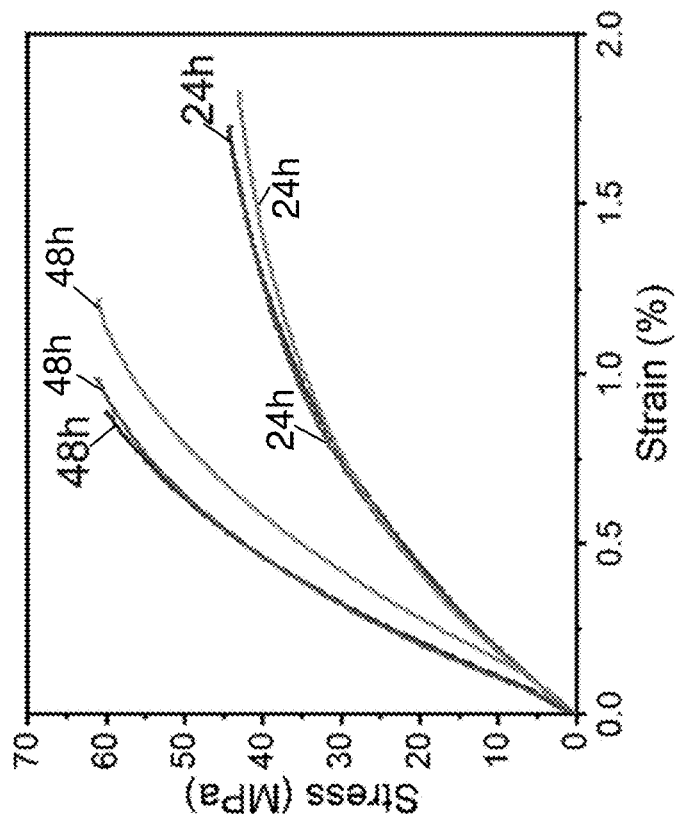
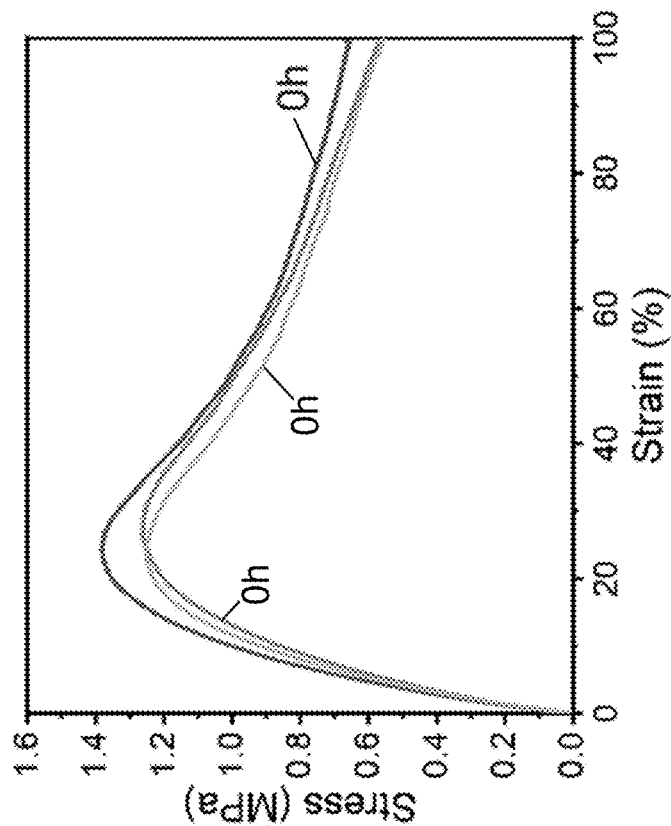
FIG. 28B
FIG. 28A

COMPOSITIONS, ARTICLES, AND METHODS INVOLVING POLYMER GRAFTED PARTICLES

RELATED APPLICATIONS

This application claims priority under 35 U.S.C. § 119(e) to U.S. Provisional Application Ser. No. 63/270,012, filed Oct. 20, 2021, entitled "COMPOSITIONS, ARTICLES, AND METHODS INVOLVING POLYMER GRAFTED PARTICLES," and to U.S. Provisional Application Ser. No. 63/230,374, filed Aug. 6, 2021, entitled "COMPOSITIONS, ARTICLES, AND METHODS INVOLVING POLYMER GRAFTED PARTICLES," each of which is incorporated herein by reference in its entirety for all purposes.

GOVERNMENT SPONSORSHIP

This invention was made with government support under CHE-1653289 awarded by the National Science Foundation. The government has certain rights in the invention.

TECHNICAL FIELD

Composites comprising polymer grafted particles that are capable of forming interparticle interactions, and related methods, are generally described.

BACKGROUND

Polymer grafted nanoparticles (PGNPs) are ideal additives to enhance the mechanical properties and functionality of a polymer matrix (e.g., plastics and rubbers) and can even potentially serve as single-component building blocks for highly filled composites if the polymer content is kept low. The major challenge facing such syntheses is that PGNP-based solids with short polymer brushes often have low mechanical strength and limited processability. It therefore remains difficult to form robust architectures with a variety of three-dimensional (3D) macroscopic shapes from single-component PGNP composites.

SUMMARY

Composites comprising polymer grafted particles that are capable of forming interparticle interactions, and related methods, are generally described. The subject matter of the present invention involves, in some cases, interrelated products, alternative solutions to a particular problem, and/or a plurality of different uses of one or more systems and/or articles.

According to certain embodiments, a composition is described, the composition comprising a particulate/polymer composite comprising a first particle having a surface to which polymer chains are grafted, wherein at least some of the polymer chains grafted to the surface of the first particle are linked to a polymer chain grafted to a different particle, wherein the composition comprises between greater than or equal to 0.1 wt. % and less than or equal to 50 wt. % of material other than the particulate/polymer composite.

In some embodiments, a method is described, the method comprising thermoforming into a pre-anneal, self-supporting structure, a composition comprising a particulate/polymer composite comprising a first particle having a surface to which polymer chains are grafted, and having a glass transition temperature less than or equal to 80° C., and annealing the pre-anneal, self-supporting structure into an annealed structure having a glass transition temperature greater than 80° C.

In certain embodiments, a method is described, the method comprising, in a pre-crosslinked composition having a first mass, the pre-linked composition comprising a particulate/polymer composite comprising a first particle having a surface to which polymer chains are grafted, crosslinking at least some polymer chains grafted to the surface of the first particle to a polymer chain grafted to a different particle, thereby forming a crosslinked composition having a second mass that is no less than 50% of the first mass.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures:

FIG. 6A shows, according to some embodiments, thermogravimetric analysis (TGA) data corresponding to polymer grafted particles and linear polymers;

FIG. 6B shows, according to some embodiments, the TGA data of FIG. 6A replotted and normalized by polymer content;

FIGS. 28A-28B show, according to some embodiments, tensile testing of polymer grafted particles after thermally aging;

DETAILED DESCRIPTION

Figure 1:
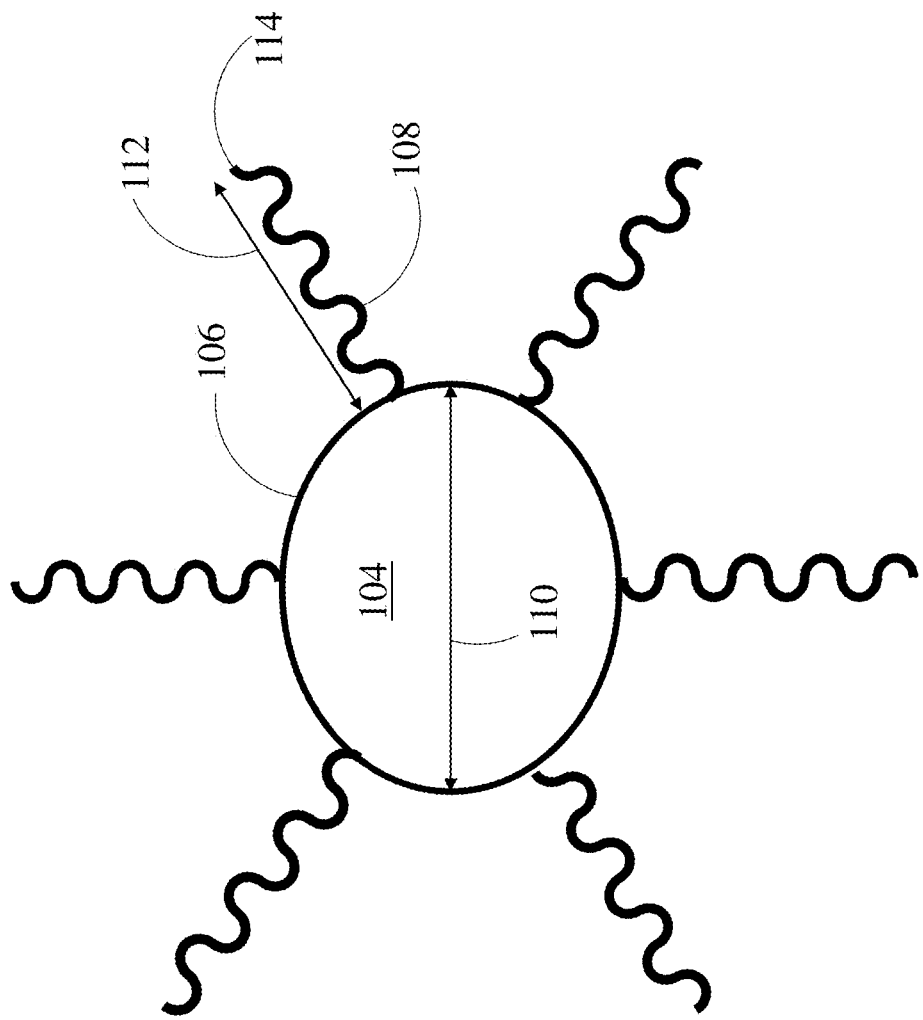
FIG. 1 shows, according to some embodiments, a schematic diagram of a particulate/polymer composite.
Figure 1:
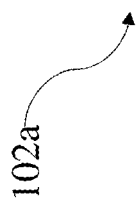

Polymer grafted particles are a promising additive to enhance the mechanical properties and functionality of a polymer matrix. Adding filler materials to plastics and rubbers, for example, is a common approach for improving mechanical performance and adding or augmenting specific traits of the material, such as the thermal or electrical conductivity. Low aspect-ratio filler materials are typically incorporated into thermoplastic polymer matrices by mechanical or melt mixing, though solution blending and in-situ growth processes can also be used. Overcoming chemical incompatibility and ensuring a uniform distribution of filler particles is extremely difficult with these processing methods, however, and significant aggregation of filler occurs at even relatively low loading due to unfavorable polymer-filler interfacial interactions. The formation of these aggregates and agglomerates can lower the strength and toughness of the resulting composite, and the consequent inhomogeneity in filler distribution can interfere with filler functionality or other desirable properties like optical clarity. As a result, low filler loadings (typically ~20% or less) are commonly used in cases where a reduction of strength or toughness is not acceptable, limiting the extent to which inorganic particles can enhance or positively impact the properties of useful composites.

Attaching polymer chains to the surfaces of particles is an attractive means of overcoming the aforementioned limitations, as the polymer chains significantly reduce the interaction energy between filler and matrix. Particles with polymer chains tethered to the surface at one end to form a brush layer are often referred to as polymer grafted particles. If the grafted chains are not long enough to form interchain entanglements, materials comprising the polymer grafted particles are brittle and weak, and can even exhibit poorer mechanical properties than those of the corresponding unfilled homopolymer. Furthermore, as a result of slower polymer dynamics and increased stiffness, polymer grafted particles with shorter polymer grafts may be more difficult to process, limiting the types of macroscopic structures that can be formed.

The inventors have realized and appreciated that short polymer grafts that contain reactive groups capable of forming interparticle interactions (e.g., covalent interactions) between crosslinkable polymer grafted particles is a promising route for overcoming limitations in processability and functionality. Conventional crosslinking strategies often require careful blending of components or slow drying from solution assembly methods. Described herein, however, is a transformative synthetic method that, in accordance with certain embodiments, produces composite materials in arbitrary geometries using polymer thermoforming methods. In some embodiments, particles comprising short polymer brushes with low glass transition temperatures are first thermoformed into macroscopic shapes using, for example, hot pressing, compression molding, extrusion, or vacuum forming. In certain embodiments, the resulting soft composites are then aged at elevated temperatures, which results in the formation of covalent linkages between the polymer grafted particles, thereby increasing the glass transition temperature and the stiffness of the material. The synthetic strategy can advantageously be adapted to a variety of particle and polymer compositions and is therefore a versatile approach to synthesize nanocomposites that are functional, mechanically robust, and easily processable.

Particulate/polymer composite structures comprising a particle with short polymer chains grafted to the surface of the particle are described herein. In some embodiments, the composite structure may be synthesized by providing a particle functionalized with reactive functional groups and polymerizing the functional groups to form the polymer-grafted particle. The particulate/polymer composite may subsequently be shaped by thermoforming the composite into a geometry necessary for a particular application, according to some embodiments. The composite comprising the polymer-grafted particles may then be thermally aged, in certain embodiments, to induce interparticle linkages (e.g., covalent linkages) between grafted polymers on different particles. According to some embodiments, the thermally aged composite materials may be used as an additive in a polymeric matrix, such as rubber or plastic. In certain embodiments, the composition (e.g., polymer matrix) may comprise the additive in a high filler loading while maintaining a uniform distribution of the additive. In some embodiments, the additive may at least partially interact with (e.g., bind to) one or more components of the composition (e.g., polymer matrix). According to certain embodiments, the composite advantageously increases certain physical properties of the matrix, such as the modulus, hardness, glass transition temperature, and/or thermal conductivity of the matrix.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

According to certain embodiments, the composite (e.g., particulate/polymer composite) comprises a particle. FIG. 1 shows, according to some embodiments, a schematic diagram of a particulate/polymer composite. Referring to FIG. 1, composite 102a (e.g., particulate/polymer composite) comprises particle 104.

The particle may have any of a variety of suitable shapes. In some embodiments, for example, and as shown in FIG. 1, the particle may be substantially spherical. Although a spherical shape is shown in the figures, other shapes are also possible, as the disclosure is not meant to be limiting in this regard. In certain embodiments, for example, the particle may have a tubular, conical, or two-dimensional shape.

The particle may have any of a variety of suitable sizes. Referring, for example, to FIG. 1, particle 104 may have an average maximum dimension 110 (e.g., maximum diameter). According to some embodiments, the particle has an average maximum dimension of greater than or equal to 5 nm, greater than or equal to 10 nm, greater than or equal to 25 nm, greater than or equal to 50 nm, greater than or equal to 100 nm, greater than or equal to 500 nm, greater than or equal to 1 micron, or greater than or equal to 5 microns. In some embodiments, the particle has an average maximum dimension less than or equal to 10 microns, less than or equal to 5 microns, less than or equal to 1 micron, less than or equal to 500 nm, less than or equal to 100 nm, less than or equal to 50 nm, less than or equal to 25 nm, or less than or equal to 10 nm. Combinations of the above recited ranges are also possible (e.g., the particle has an average maximum dimension between greater than or equal to 5 nm and less than or equal to 10 microns, the particle has an average maximum dimension between greater than or equal to 50 nm and less than or equal to 100 nm). Methods of determining the average maximum dimension of the particle include, but are not limited to, scanning electron microscopy (SEM) and/or transmission electron microscopy (TEM).

The particle may comprise any of a variety of suitable materials. According to some embodiments, for example, the particle comprises an oxide, a metal, a polymer, a semiconductor, a carbon-based material, and/or a metal-organic framework (MOF). The particle may, in some embodiments, comprise silicon dioxide ($SiO_2$), aluminum oxide ($Al_2O_3$), titanium dioxide ($TiO_2$), germanium dioxide ($GeO_2$), iron oxide, zinc oxide, lanthanum oxide, gold (Au), palladium (Pd), copper (Cu), iron (Fe), platinum (Pt), silver (Ag), a nitride (e.g., silicon nitride, boron nitride), cadmium sulfide (CdS), cadmium selenide (CdSe), cadmium telluride (CdTe), lead sulfide (PbS), a carbon nanostructure (e.g., a carbon nanoparticle, nanotube, nanowire, nanosheet, etc.), and/or a zeolitic imidazole framework. Other materials are also possible.

Methods of preparing the particles would be known to a person of ordinary skill in the art. In certain embodiments, for example, the Stöber method may be used to synthesize the particles (e.g., $SiO_2$ particles). In other embodiments, the particles may be purchased commercially. In certain embodiments, the particle may be functionalized (e.g., with reactive functional groups), as explained in further detail herein.

The composite (e.g., particulate/polymer composite) may comprise the particle in any of a variety of suitable amounts. In certain embodiments, for example, the composite comprises the particle in an amount greater than or equal to 10 wt. %, greater than or equal to 20 wt. %, greater than or equal to 30 wt. %, greater than or equal to 40 wt. %, greater than or equal to 50 wt. %, greater than or equal to 60 wt. %, greater than or equal to 70 wt. %, or greater than or equal to 80 wt. % based on the total weight of the composite. In some embodiments, the composite comprises the particle in an amount less than or equal to 90 wt. %, less than or equal to 80 wt. %, less than or equal to 70 wt. %, less than or equal to 60 wt. %, less than or equal to 50 wt. %, less than or equal to 40 wt. %, less than or equal to 30 wt. %, or less than or equal to 20 wt. % based on the total weight of the composite. Combinations of the above recited ranges are also possible (e.g., the composite comprises the particle in an amount between greater than or equal to 10 wt. % and less than or equal to 90 wt. % based on the total weight of the composite, the composite comprises the particle in an amount between greater than or equal to 40 wt. % and less than or equal to 60 wt. % based on the total weight of the composite). Other ranges are also possible. Methods of determining the amount (e.g., wt. %) of the particle in the composite include, but are not limited to, thermogravimetric analysis (TGA), ultraviolet-visible (UV-vis) spectroscopy, infrared (IR) spectroscopy, and/or TEM.

In certain embodiments, the particle has one or more surfaces to which polymer chains are grafted. Referring, for example, to FIG. 1, particle 104 has surface 106 to which polymer chains 108 are grafted. As used herein, the term "grafted" is given its ordinary meaning in the art and refers to the addition of polymer chains onto a surface. According to certain embodiments, the polymer chains may comprise a polymer (e.g., a repeating unit of monomers). In some embodiments, the polymer chains may comprise a block copolymer (e.g., a polymer derived from repeating units of two or more monomers, such as two monomers, three monomers, four monomers, etc.). According to some embodiments, the polymer chains may comprise a mixture of one or more polymers and one or more block copolymers. In certain embodiments, the polymer chains may be chemically bound to the surface (e.g., covalently hound, ionically bound, etc.).

The polymer chains may have any of a variety of suitable lengths. Referring, for example, to FIG. 1, polymer chain 108 may have maximum length 112 that is measured from surface 106 of particle 104 to terminal end 114 of polymer chain 108. According to certain embodiments, the polymer chains may have an average maximum length greater than or equal to 50 Å, greater than or equal to 100 Å, greater than or equal to 200 Å, greater than or equal to 300 Å, greater than or equal to 400 Å, greater than or equal to 500 Å, greater than or equal to 1000 Å, greater than or equal to 2000 Å, greater than or equal to 3000 Å, or greater than or equal to 4000 Å. In some embodiments, the polymer chains have an average maximum length less than or equal to 5000 Å, less than or equal to 4000 Å, less than or equal to 3000 Å, less than or equal to 2000 Å, less than or equal to 1000 Å, less than or equal to 500 Å, less than or equal to 400 Å, less than or equal to 300 Å, less than or equal to 200 Å, or less than or equal to 100 Å. Combinations of the above recited ranges are also possible (e.g., the polymer chains have an average maximum length between greater than or equal to 50 Å and less than or equal to 5000 Å, the polymer chains have an average maximum length between greater than or equal to 500 Å and less than or equal to 1000 Å). Other ranges are also possible. Methods of determining the length of the polymer chains include, but are not limited to, SEM, TEM, gel permeation chromatography (GPC), viscometry, dynamic light scattering (DLS), and/or small-angle X-ray scattering (SAXS).

The polymer chain may comprise any of a variety of suitable polymers. In certain embodiments, for example, the polymer comprises an acrylate polymer, a methacrylate polymer, a polyether, a polyolefin, a polysiloxane, a polyurethane, a polyimide, a polyamide, a polyester, a polycarbonate, combinations thereof, and/or block copolymers thereof. In some embodiments, for example, the polymer chain comprises poly(n-hexyl methacrylate), poly(n-butyl methacrylate), poly(ethyl methacrylate), combinations thereof, and/or block copolymers thereof. Other polymers and/or block copolymers are also possible.

Figure 2:
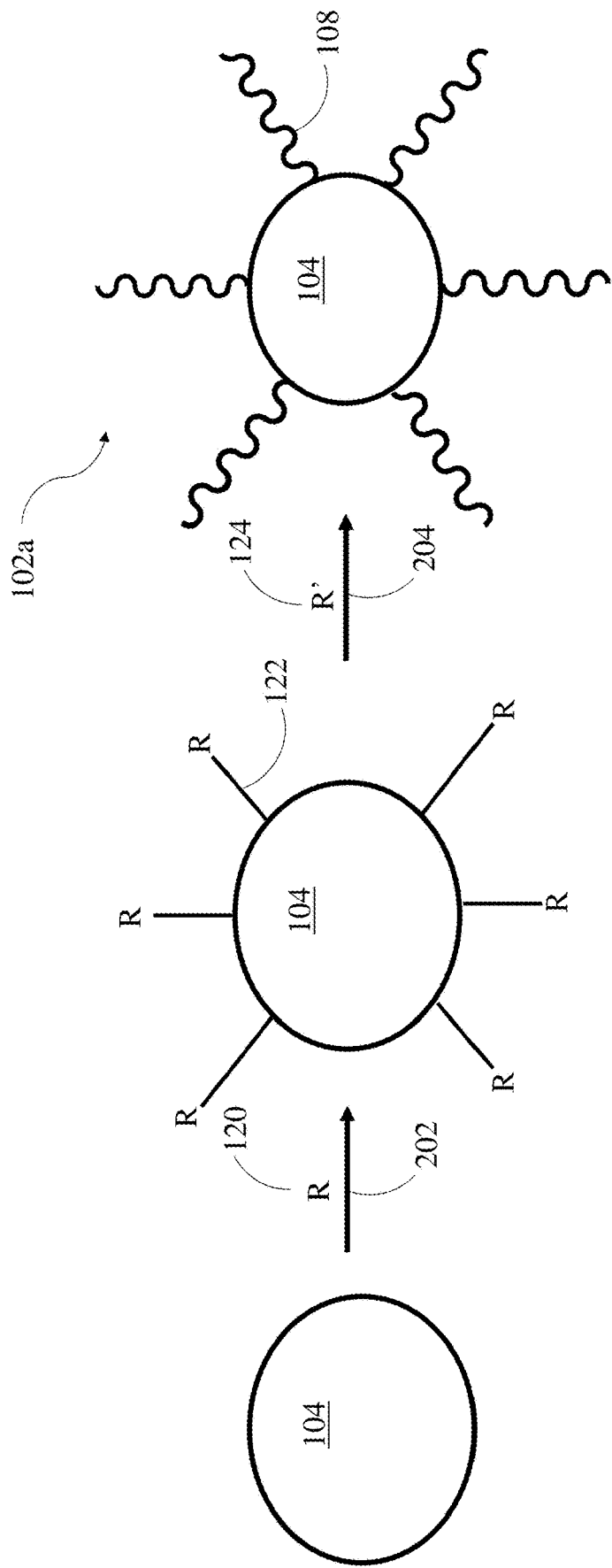
FIG. 2 shows, according to some embodiments, a schematic diagram of the synthesis of a particle grafted with polymer chains.

The particle grafted with polymer chains may be prepared by any of a variety of suitable means. FIG. 2 shows, according to some embodiments, a schematic diagram of the synthesis of a particle grafted with polymer chains. Referring to FIG. 2, particle 104 may be provided, in certain embodiments. In step 202, particle 104 may, in some embodiments, be functionalized with functional group precursor 120 (denoted as R in FIG. 2), thereby providing particle 104 functionalized with reactive functional group 122. The functional group precursor may comprise any of a variety of suitable materials as long as the resulting particle functionalized with the reactive functional group is reactive towards the polymer precursor (as explained in further detail below). In certain embodiments, for example, the functional group precursor comprises an isobutyrate moiety, an azide moiety, an alkyne moiety, a carboxylic acid moiety, an amine moiety, a thiol moiety, an epoxide moiety, and/or a vinyl moiety. Other moieties and/or functional groups are also possible.

In step 204, reactive functional groups 122 are reacted with polymer precursor 124 (denoted as R' in FIG. 2), thereby providing composite 102a comprising particle 104 grafted with polymer chains 108. The polymer precursor may comprise any of a variety of suitable materials as long as the polymer precursor is reactive towards the particle functionalized with the reactive functional group. In some embodiments, for example, the polymer precursor comprises an acrylate, a methacrylate moiety, and/or epoxide moiety. Other moieties and/or precursors are also possible.

The reactive functional groups and the polymer precursor may react via polymerization, in some embodiments. The reaction between the reactive functional group and the polymer precursor to provide the polymer chains may be any of a variety of suitable polymerization reactions, including, for example, atom transfer radical polymerization. In certain embodiments, the grafting of the polymer chains is a "grafting from" approach in which a polymer chain is initiated and propagated at the surface of the particle, as shown in FIG. 2.

Although FIG. 2 depicts a "grafting from" approach in which the polymer chain is initiated and propagated at the surface of the particle, other grafting mechanisms are possible, as the disclosure is not meant to be limiting in this regard. In some embodiments, for example, a "grafting to" approach may also be utilized, in which a polymer chain is first synthesized and then grafted to the surface of the particle.

The composite (e.g., particulate/polymer composite) may comprise the polymer chains in any of a variety of suitable amounts. In certain embodiments, for example, the composite comprises the polymer chains in an amount greater than or equal to 10 wt. %, greater than or equal to 20 wt. %, greater than or equal to 30 wt. %, greater than or equal to 40 wt. %, greater than or equal to 50 wt. %, greater than or equal to 60 wt. %, greater than or equal to 70 wt. %, or greater than or equal to 80 wt. % based on the total weight of the composite. In some embodiments, the composite comprises the polymer chains in an amount less than or equal to 90 wt. %, less than or equal to 80 wt. %, less than or equal to 70 wt. %, less than or equal to 60 wt. %, less than or equal to 50 wt. %, less than or equal to 40 wt. %, less than or equal to 30 wt. %, or less than or equal to 20 wt. % based on the total weight of the composite. Combinations of the above recited ranges are also possible (e.g., the composite comprises the polymer chains in an amount between greater than or equal to 10 wt. % and less than or equal to 90 wt. % based on the total weight of the composite, the composite comprises the polymer chains in an amount between greater than or equal to 30 wt. % and less than or equal to 40 wt. % based on the total weight of the composite). Other ranges are also possible. Methods of determining the amount (e.g., wt. %) of the polymer chains in the composite include, but are not limited to, TGA, UV-vis spectroscopy, IR spectroscopy, and/or TEM.

The composite (e.g., particulate/polymer composite) may comprise a ratio of particulate to polymer in any of a variety of suitable amounts. In some embodiments, for example, the composite comprises a wt. % ratio of particulate to polymer of at least at least 1:10, at least 1:8, at least 1:5, at least 1:4, at least 1:3, at least 1:2, at least 1:1, at least 1:0.5, at least 1:0.25, at least 1:0.2 or at least 1:0.1. In certain embodiments, the composite comprises a wt. % ratio of particulate to polymer of less than or equal to 10:1, less than or equal to 8:1, less than or equal to 5:1, less than or equal to 4:1, less than or equal to 3:1, less than or equal to 2:1, less than or equal to 1:1, less than or equal to 0.5:1, less than or equal to 0.25:1, less than or equal to 0.2:1, or less than or equal to 0.1:1. Combinations of the above recited ranges are also possible (e.g., the composite comprises a wt. % ratio of particulate to polymer of between at least 1:10 and less than or equal to 10:1, the composite comprise a wt. % ratio of particulate to polymer of between at least 1:2 and less than or equal to 2:1). Other ranges are also possible. Methods of determining the ratio of particulate to polymer include, but are not limited to, TGA, UV-vis spectroscopy, IR spectroscopy, and/or TEM.

According to certain embodiments, a composition comprising the composite (e.g., pre-crosslinked composite) may be thermoformed into a pre-anneal, self-supporting structure. As used herein, the term "self-supporting structure" refers to a material that is strong enough to support its own weight over a maximum dimension of the material when the material is at least partially suspended under the force of earth's gravity.

In some embodiments, the composition comprising the composite (e.g., pre-crosslinked composite) may be formed into any of a variety of suitable shapes, sizes, and/or structures, depending on the particular application, using thermoforming methods. In certain embodiments, for example, the composite (e.g., pre-crosslinked composite) may be thermoformed into a two-dimensional shape such as a sheet (which may optionally be patterned) or a three-dimensional shape such as a tube, column, and/or filament. Other shapes and structures are also possible as the disclosure is not meant to be limiting in this regard. Suitable thermoforming methods include, but are not limited to, hot pressing, compression molding, extrusion, and/or vacuum forming.

The composition comprising the composite (e.g., pre-crosslinked composite) may be thermoformed at any of a variety of suitable temperatures. In certain embodiments, for example, the composite (e.g., pre-crosslinked composite) is thermoformed at a temperature greater than or equal to 20° C., greater than or equal to 30° C., greater than or equal to 40° C., greater than or equal to 50° C., greater than or equal to 75° C., greater than or equal to 100° C., greater than or equal to 125° C., greater than or equal to 150° C., or greater than or equal to 175° C. In some embodiments, the composite (e.g., pre-crosslinked composite) is thermoformed at a temperature less than or equal to 200° C., less than or equal to 175° C., less than or equal to 150° C., less than or equal to 125° C., less than or equal to 100° C., less than or equal to 75° C., less than or equal to 50° C., less than or equal to 40° C., or less than or equal to 30° C. Combinations of the above recited ranges are also possible (e.g., the composite is thermoformed at a temperature between greater than or equal to 20° C. and less than or equal to 200° C., the composite is thermoformed at a temperature between greater than or equal to 125° C. and less than or equal to 175° C.). Other ranges are also possible.

According to certain embodiments, the pre-crosslinked composite (e.g., polymer/particulate composite) may have any of a variety of suitable glass transition temperatures. In certain embodiments, for example, the pre-linked composite has a glass transition temperature less than or equal to 80° C., less than or equal to 70° C., less than or equal to 60° C., less than or equal to 50° C., less than or equal to 40° C., or less than or equal to 30° C. In some embodiments, the pre-linked composite has a glass transition temperature greater than or equal to 20° C., greater than or equal to 30° C., greater than or equal to 40° C., greater than or equal to 50° C., greater than or equal to 60° C., or greater than or equal to 70° C. Combinations of the above recited ranges are also possible (e.g., the pre-linked composite has a glass transition temperature between greater than or equal to 20° C. and less than or equal to 80° C., the pre-linked composite has a glass transition temperature between greater than or equal to 40° C. and less than or equal to 50° C.). Other ranges are also possible. Methods of determining the glass transition temperature of the composite (e.g., pre-crosslinked composite) include, but are not limited to, dynamic mechanical analysis (DMA).

According to certain embodiments, the self-supporting, pre-anneal structure (e.g., pre-crosslinked composite) may be annealed into an annealed structure (e.g., a crosslinked composite). In certain embodiments, annealing the pre-anneal structure causes a reaction (e.g., a crosslinking reaction) between polymer chains, in which interparticle interactions are formed, as explained in further detail below. The formation of interparticle interactions between polymer chains on different particles may advantageously cause the composite (e.g., particulate/polymer composite) to have a change in physical properties, such as an increased modulus, hardness, and/or glass transition temperature, according to some embodiments.

The pre-anneal structure may be annealed at any of a variety of suitable temperatures. In certain embodiments, for example, the pre-anneal structure is annealed at a temperature greater than or equal to 100° C., greater than or equal to 125° C., greater than or equal to 150° C., greater than or equal to 175° C., greater than or equal to 200° C., greater than or equal to 225° C., greater than or equal to 250° C., greater than or equal to 275° C., greater than or equal to 300° C., or greater than or equal to 325° C. In some embodiments, the pre-anneal structure is annealed at a temperature less than or equal to 350° C., less than or equal to 325° C., less than or equal to 300° C., less than or equal to 275° C., less than or equal to 250° C., less than or equal to 225° C., less than or equal to 200° C., less than or equal to 175° C., less than or equal to 150° C., or less than or equal to 125° C. Combinations of the above recited ranges are also possible (e.g., the pre-anneal structure is annealed at a temperature between greater than or equal to 100° C. and less than or equal to 350° C., the pre-anneal structure is annealed at a temperature between greater than or equal to 150° C. and less than or equal to 175° C.). Other ranges are also possible.

According to some embodiments, the temperature is ramped while the pre-anneal structure is annealed. In certain embodiments, for example, the initial temperature during the anneal process may be 75% lower, 50% lower, 25% lower, or 10% lower than the final temperature during the anneal process.

The pre-anneal structure may be annealed for any of a variety of suitable times. In certain embodiments, for example, the pre-anneal structure may be aged for a certain time at a certain temperature, or may be aged for a certain time at a range of temperatures as the temperature is ramped from an initial temperature to a final temperature. In some embodiments, the pre-anneal structure is annealed for greater than or equal to 30 minutes, greater than or equal to 1 hour, greater than or equal to 2 hours, greater than or equal to 5 hours, greater than or equal to 10 hours, greater than or equal to 15 hours, greater than or equal to 20 hours, greater than or equal to 24 hours, or greater than or equal to 36 hours. In certain embodiments, the pre-anneal structure is annealed for less than or equal to 48 hours, less than or equal to 36 hours, less than or equal to 24 hours, less than or equal to 20 hours, less than or equal to 15 hours, less than or equal to 10 hours, less than or equal to 5 hours, or less than or equal to 2 hours. Combinations of the above recited ranges are also possible (e.g., the pre-anneal structure is annealed for greater than or equal to 30 minutes and less than or equal to 48 hours, the pre-anneal structure is annealed for greater than or equal to 15 hours and less than or equal to 20 hours). Other ranges are also possible.

Figure 3:
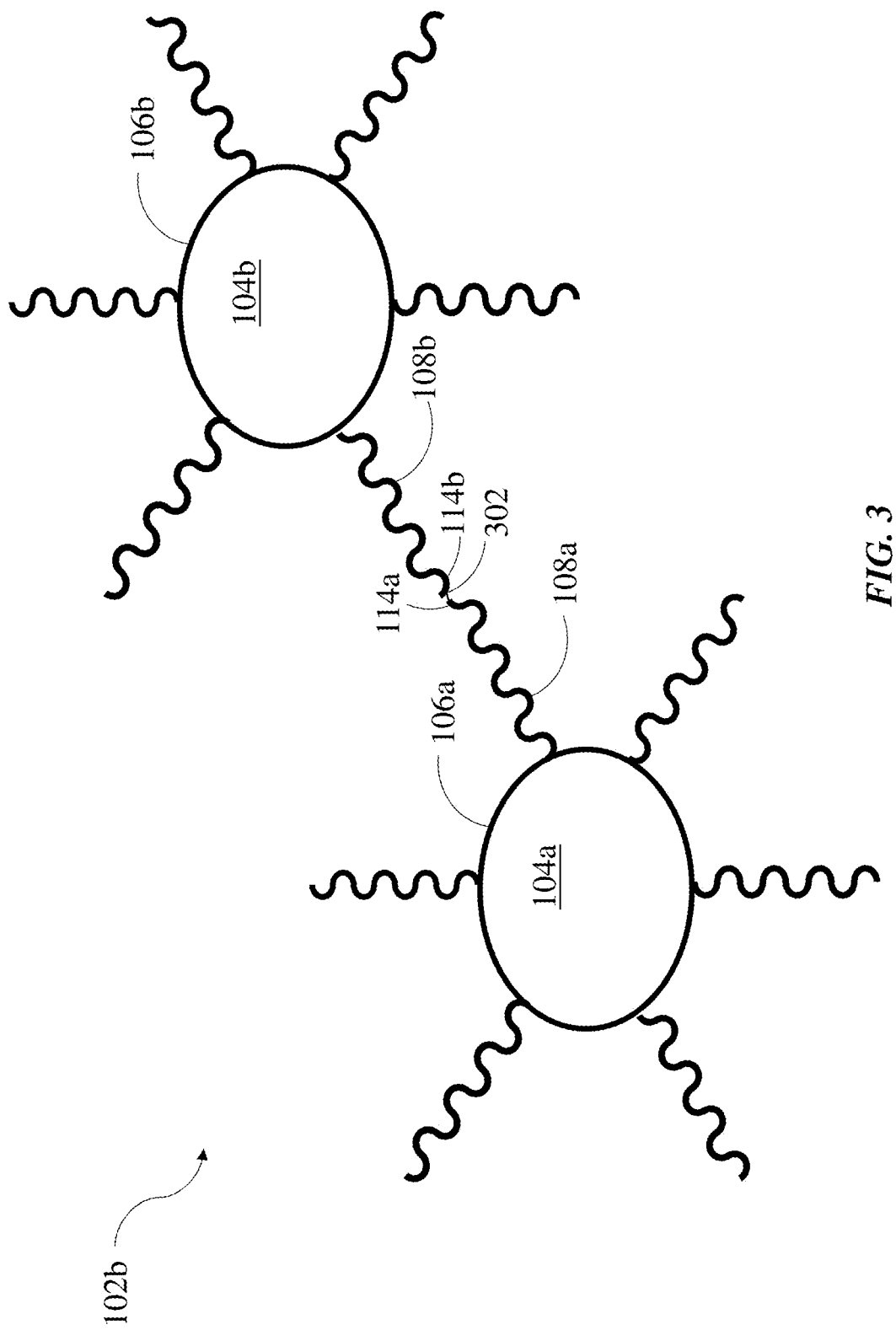
FIG. 3 shows, according to some embodiments, a schematic diagram of a particulate/polymer composite comprising a first polymer having a surface to which polymer chains are grafted, wherein at least one of the polymer chains are linked to a polymer chain grafted to a different particle.

According to some embodiments, as a result of annealing the pre-anneal structure, at least some of the polymer chains grafted to the one or more surfaces of the particle (e.g., first particle) may be linked to (e.g., crosslinked with) a polymer chain grafted to a different particle. FIG. 3 shows, according to certain embodiments, a schematic diagram of a particulate/polymer composite comprising a first particle having a surface to which polymer chains are grafted, wherein at least one of the polymer chains are linked to a polymer chain grafted to a different particle. Referring to FIG. 3, for example, composite 102b comprises first particle 104a having surface 106a to which polymer chains 108a are grafted. In some embodiments, at least one of polymer chains 108a may be linked to (e.g., crosslinked with) polymer chain 108b grafted to surface 106b of different particle 104b (e.g., second particle) via linkage 302. Linkage 302 may, in some embodiments, be formed between terminal end 114a of polymer chain 108a and terminal end 114b of polymer chain 108b.

Figure 4:
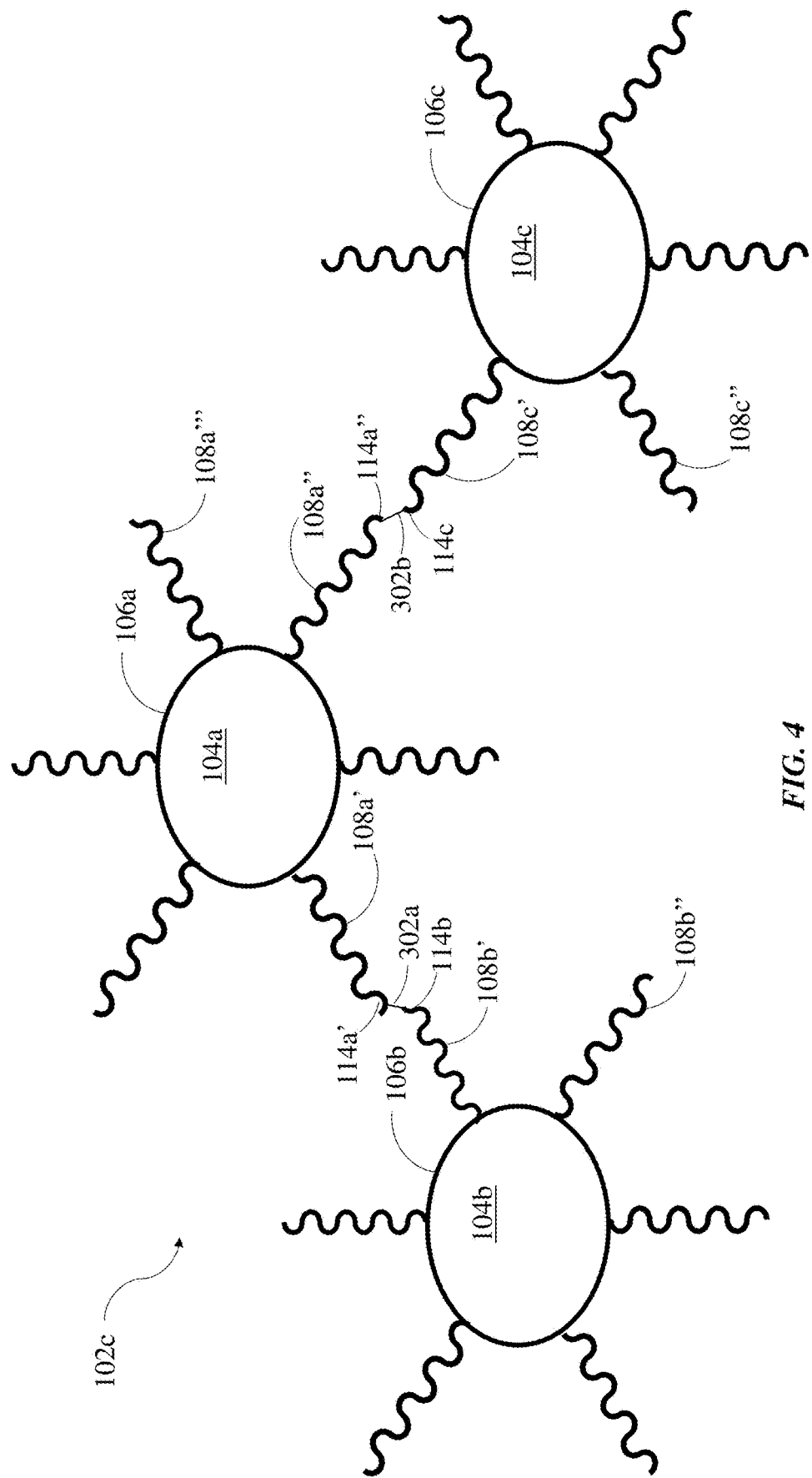
FIG. 4 shows, according to some embodiments, a schematic diagram of a particulate/polymer composite comprising a first polymer having a surface to which polymer chains are grafted, wherein at least some of the polymer chains are linked to a polymer chain grafted to a different particle.

FIG. 4 shows, according to some embodiments, a schematic diagram of a particulate/polymer composite comprising a first particle having a surface to which polymer chains are grafted, wherein at least some of the polymer chains are linked to (e.g., crosslinked with) a polymer chain grafted to a different particle. Referring to FIG. 4, for example, composite 102c comprises first particle 104a having surface 106a to which polymer chains 108a are grafted, wherein at least some of polymer chains 108a are linked to (e.g., crosslinked with) a polymer chain grafted to a different particle. In some embodiments, for example, polymer chain 108a' of first particle 104a is linked to polymer chain 108b' grafted to surface 106b of different particle 104b (e.g., second particle) via linkage 302a, and polymer chain 108a" of first particle 104a is linked to polymer chain 108c' grafted to surface 106c of different particle 104c (e.g., third particle) via linkage 302b. Linkage 302a may, in some embodiments, be formed between terminal end 114a' of polymer chain 108a' and terminal end 114b of polymer chain 108b', while linkage 302b is formed between terminal end 114a" of polymer chain 108a" and terminal end 114c of polymer chain 108c'.

Although not shown in the figures, any number of the polymer chains on each particle may be linked to (e.g., crosslinked with) a polymer chain grafted to a different particle. In some embodiments, for example, polymer chain 108a''' (and/or any other polymer chains grafted to surface 106a of particle 104a) may be linked to a polymer chain grafted to a different particle (e.g., a fourth particle). Polymer chain 108b" (and/or any other polymer chains grafted to surface 106b of particle 104b) may, in some embodiments, be linked to a polymer chain grafted to a different particle (e.g., a fifth particle). In certain embodiments, polymer chain 108c" (and/or any other polymer chains grafted to surface 106c of particle 104c) may be linked a polymer chain grafted to a different particle (e.g., a sixth particle). According to some embodiments, configuring the composite such that the polymer chains are capable of forming inter-particle linkages advantageously provides an interconnected network of particulates and polymers that may be used, for example, in additive applications.

The linkages between the polymer chains may be any of a variety of suitable linkages. In some embodiments, for example, the linkage may be a bonding interaction (e.g., a covalent interaction, a non-covalent interaction, an ionic interaction, a hydrogen-bonding interaction, a Van der Waals interaction). In certain embodiments, at least some of the polymer chains grafted to the one or more surfaces of the particle (e.g., first particle) are covalently linked to the polymer chains grafted to different particles. Referring to FIG. 3, for example, polymer chain 108a' may be covalently linked (e.g., crosslinked) (via linkage 302) to polymer chain 108b. In some embodiments, at least 50%, or at least 70%, or at least 90% of the linkages between the polymer chains grafted to the first particle and the polymer chains grafted to the different particle are covalent linkages. In certain embodiments, substantially all of the linkages between the polymer chains grafted to the first particle and the polymer chains grafted to the different particle are covalent linkages. Examples of suitable covalent linkages include, but are not limited to, anhydride linkages, ether linkages, amide linkages, triazole linkages, ester linkages, sulfide linkages, urea linkages, imide linkages, and/or thioester linkages. Other linkages are also possible.

According to some embodiments, the pre-anneal structure (e.g., pre-crosslinked composite) may have a first mass, and the post-anneal structure (e.g., crosslinked composite) may have a second mass that is not substantially different from the first mass. In certain embodiments, for example, there is limited mass loss after thermally aging the particulate/polymer composite. In some embodiments, the pre-crosslinked composite has a first mass and the crosslinked composite has a second mass that is no less than 50%, no less than 55%, no less than 60%, no less than 65%, no less than 70%, no less than 75%, no less than 80%, no less than 85%, no less than 90%, no less than 95%, or no less than 98% of the first mass. In certain embodiments, the pre-crosslinked composite has a first mass and the crosslinked composite has a second mass that is less than or equal to 98%, less than or equal to 95%, less than or equal to 90%, less than or equal to 85%, less than or equal to 80%, less than or equal to 75%, less than or equal to 70%, less than or equal to 60%, or less than or equal to 55% of the first mass. Combinations of the above recited ranges are also possible (e.g., the pre-crosslinked composite has a first mass and the crosslinked composite has a second mass that is between no less than 50% and less than or equal to 98% of the first mass, the pre-crosslinked composite has a first mass and the crosslinked composite has a second mass that is between no less than 85% and less than or equal to 90% of the first mass).

As explained herein, annealing the composite may result in a change in one or more physical properties of the material. According to some embodiments, for example, the composite may annealed such that the composite has a higher glass transition temperature as compared to the pre-anneal composite. In certain embodiments, the annealed composite has a glass transition temperature of at least 80° C., at least 100° C., at least 125° C., at least 150° C., at least 175° C., at least 200° C., or at least 225° C. In some embodiments, the annealed composite has a glass transition temperature less than or equal to 250° C., less than or equal to 225° C., less than or equal to 200° C., less than or equal to 175° C., less than or equal to 150° C., less than or equal to 125° C., or less than or equal to 100° C. Combinations of the above recited ranges are also possible (e.g., the annealed composite has a glass transition temperature between at least 80° C. and less than or equal to 250° C., the annealed composite has a glass transition temperature between at least 100° C. and less than or equal to 125° C.). Other ranges are also possible. As stated above, methods of determining the glass transition temperature of the composite (e.g., crosslinked composite) include, but are not limited to, DMA and/or DSC.

In certain embodiments wherein the polymer chains comprise at least one block copolymer, the annealed composite may have a substantially low glass transition temperature. In some embodiments, for example, a first monomer of the block copolymer may have a substantially low glass transition temperature, and a second monomer of the block copolymer may be linked to (e.g., crosslinked with) a polymer chain grafted to a different particle. In some such embodiments, the glass transition temperature of the annealed composite (e.g., comprising at least one block copolymer) may be at least −15° C., at least −10° C., at least 0° C., at least 20° C., at least 40° C., at least 60° C., at least 80° C., at least 100° C., at least 125° C., at least 150° C., at least 175° C., at least 200° C., or at least 225° C. In certain embodiments, the glass transition temperature of the annealed composite (e.g., comprising at least one block copolymer) may be less than or equal to 250° C., less than or equal to 225° C., less than or equal to 200° C., less than or equal to 175° C., less than or equal to 150° C., less than or equal to 125° C., less than or equal to 100° C., less than or equal to 75° C., less than or equal to 50° C., less than or equal to 25° C., less than or equal to 0° C., or less than or equal to −10° C. Combinations of the above recited ranges are also possible (e.g., the annealed composite comprising one or more block copolymers may have a glass transition temperature between at least −15° C. and less than or equal to 250° C., the annealed composite comprising one or more block copolymers may have a glass transition temperature between at least 0° C. and less than or equal to 100° C.). Other ranges are also possible.

The annealed composite may have any of a variety of suitable modulus values. In certain embodiments, for example, the annealed composite has a modulus of at least 0.1 GPa, at least 0.5 GPa, least 0.7 GPa, at least 0.9 GPa, at least 1.1 GPa, at least 1.5 GPa, at least 2 GPa, at least 5 GPa, at least 10 GPa, at least 20 GPa, at least 50 GPa, or at least 100 GPa. According to some embodiments, the annealed composite has a modulus of less than or equal to 150 GPa, less than or equal to 100 GPa, less than or equal to 50 GPa, less than or equal to 20 GPa, less than or equal to 10 GPa, less than or equal to 5 GPa, less than or equal to 2 GPa, less than or equal to 1.5 GPa, less than or equal to 1.1 GPa, less than or equal to 0.9 GPa, less than or equal to 0.7 GPa, or less than or equal to 0.5 GPa. Combinations of the above recited ranges are also possible (e.g., the annealed composite has a modulus between at least 0.1 GPa and less than or equal to 150 GPa, the annealed composite has a modulus between at least 2 GPa and less than or equal to 5 GPa). Other ranges are also possible. Methods of determining the modulus of the annealed composite include, but are not limited to, nanoindentation, DMA, and/or tensile testing.

The annealed composite may have any of a variety of suitable hardness values. In some embodiments, for example, the annealed composite has a hardness of at least 25 MPa, at least 50 MPa, at least 75 MPa, at least 100 MPa, at least 200 MPa, at least 300 MPa, at least 400 MPa, at least 500 MPa, at least 750 MPa, or at least 1000 MPa. According to certain embodiments, the annealed composite has a hardness less than or equal to 1500 MPa, less than or equal to 1000 MPa, less than or equal to 750 MPa, less than or equal to 500 MPa, less than or equal to 400 MPa, less than or equal to 300 MPa, less than or equal to 200 MPa, less than or equal to 100 MPa, less than or equal to 75 MPa, or less than or equal to 50 MPa. Combinations of the above recited ranges are also possible (e.g., the annealed composite has a hardness between at least 25 MPa and less than or equal to 1500 MPa, the annealed composite has a hardness between at least 100 MPa and 200 MPa). Other ranges are also possible. Methods of determining the hardness of the annealed composite include, but are not limited to, nanoindentation and/or pencil testing using the ASTM D3363 standard test method for hardness.

The annealed composite may have any of a variety of suitable thermal conductivities. In some embodiments, for example, the annealed composite has a thermal conductivity greater than or equal to 0.9 J/gK, greater than or equal to 1.0 J/gK, greater than or equal to 1.1 J/gK, greater than or equal to 1.2 J/gL, greater than or equal to 1.3 J/gK, greater than or equal to 1.4 J/gK, greater than or equal to 1.5 J/gK, greater than or equal to 1.6 J/gK, or greater than or equal to 1.7 J/gK. According to certain embodiments, the annealed composite has a thermal conductivity less than or equal to 1.8 J/gK, less than or equal to 1.7 J/gK, less than or equal to 1.6 J/gK, less than or equal to 1.5 J/gK, less than or equal to 1.4 J/gK, less than or equal to 1.3 J/gK, less than or equal to 1.2 J/gK, less than or equal to 1.1 J/gK, or less than or equal to 1.0 J/gK. Combinations of the above recited ranges are also possible (e.g., the annealed composite has a thermal conductivity between greater than or equal to 0.9 J/gK and less than or equal to 1.8 J/gK, the annealed composite has a thermal conductivity between greater than or equal to 1.1 J/gK and less than or equal to 1.2 J/gK. Methods of determining the thermal conductivity of the annealed composite include, but are not limited to, DSC, laser flash analysis, and/or time-domain thermoreflectance.

According to certain embodiments, the composite (e.g., the annealed particulate/polymer composite) may be employed as an additive. In some embodiments for example, a composition may comprise the annealed particulate/polymer composite. The composition (e.g., polymer matrix) may comprise the additive (e.g., the annealed particulate/polymer composite) in a high filler loading while maintaining a uniform distribution of the additive. In certain embodiments, the additive may at least partially interact with (e.g., bind to) the polymer matrix. For example, in some embodiments, at least a portion of the annealed particulate/polymer composite may bind (e.g., covalently bind) to at least a portion of the composition (e.g., polymer matrix). Other types of interactions between the annealed particulate/polymer composite and the polymer matrix are also possible, such as ionic interactions, van der Waals interactions, and/or hydrogen-bonding interactions.

The annealed particulate/polymer composite may, in certain embodiments, change the physical properties of the composition. Advantageously, for example, the presence of the annealed particulate/polymer composite as an additive may provide an increase in the modulus, hardness, glass transition temperature, and/or thermal conductivity of the composition. Suitable compositions include polymer matrices, such as, but not limited to, plastics and/or rubber. The composition comprising the crosslinked composite may have any of the moduli, hardness values, glass transition temperatures, or thermal conductivities mentioned above.

The composition may comprise any of a variety of suitable amounts of material other than the composite. In certain embodiments, the composition comprises an advantageously low (or no) amount of material other than the composite, such that the composition may be (or essentially be) a single-component composition comprising the composite. In other embodiments in which the composite is employed as an additive, the composition may comprise the composite in an amount greater than the material other than the composite.

In some embodiments, for example, the composition comprises less than or equal to 50 wt. %, less than or equal to 40 wt. %, less than or equal to 30 wt. %, less than or equal to 20 wt. %, less than or equal to 10 wt. %, less than or equal to 5 wt. %, less than or equal to 2 wt. %, less than or equal to 1 wt. %, less than or equal to 0.50 wt. %, less than or equal to 0.10 wt. %, or less than or equal to 0.01 wt. % of material other than the composite. In certain embodiments, the composition comprises greater than or equal to 0 wt. %, greater than or equal to 0.01 wt. %, greater than or equal to 0.10 wt. %, greater than or equal to 0.50 wt. %, greater than or equal to 1 wt. %, greater than or equal to 2 wt. %, greater than or equal to 5 wt. %, greater than or equal to 10 wt. %, greater than or equal to 20 wt. %, greater than or equal to 30 wt. %, or greater than or equal to 40 wt. % of material other than the composite. Combinations of the above recited ranges are also possible (e.g., the composition comprises between less than or equal to 50 wt. % and greater than or equal 0.01 wt. % of material other than the composite, the composition comprises between less than or equal to 20 wt. % and greater than or equal to 10 wt. % of material other than the composite. Other ranges are also possible. Methods of determining the amount (e.g., wt. %) of material other than the particles and the polymers grafted to the particle surfaces include inductively coupled plasma mass spectrometry (ICP-MS).

The following examples are intended to illustrate certain embodiments of the present invention, but do not exemplify the full scope of the invention.

Example 1

The following example describes the synthesis and evaluation of composites comprising polymer grafted $SiO_2$ particles.

The development of a single component material capable of forming covalent crosslinks with itself involves the use of polymers with functional groups that can transform under appropriate external stimuli. A potential design could make use of the ester side chains present in many common polyacrylate and polymethacrylate polymers. Acrylates and methacrylates are known to undergo side chain decomposition at elevated temperatures. The rate at which the ester side chains decompose to form acrylic or methacrylic acid residues increases with increasing length of the alkyl side chain, and the resulting acid groups react with each other in a dehydration process to yield inter- and intramolecular anhydride crosslinks. Thermal aging of acrylic polymers with long (butyl and longer) side chains yields insoluble, crosslinked solids. This process, however, has not been examined as a means to crosslink polymer grafted nanoparticles (PGNPs), and it remains to be determined if the formation of a dense polymer brush would still permit crosslinks between adjacent particles in a composite.

Figure 5A:
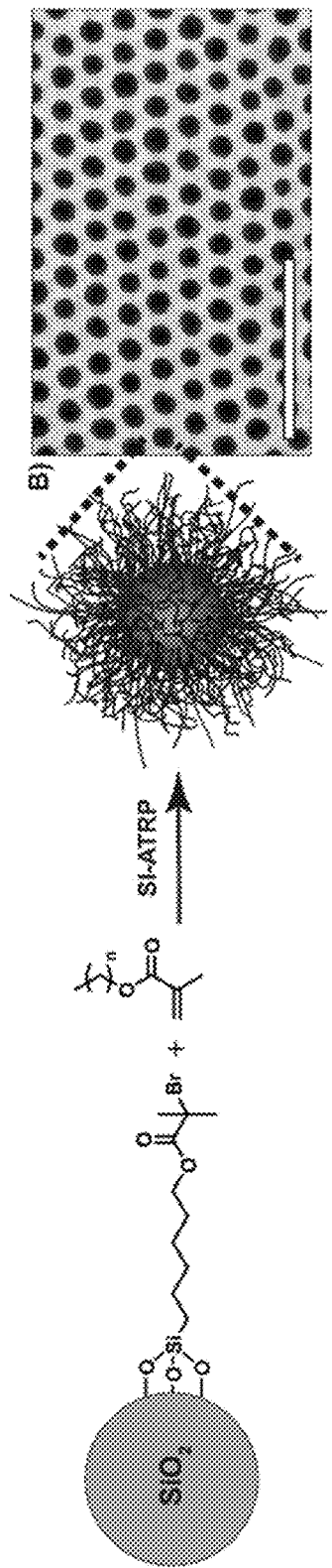
FIG. 5A shows, according to some embodiments, a schematic diagram of the synthesis of polymer grafted particles comprising $SiO_2$ and a scanning electron microscopy (SEM) image of the resulting polymer grafted particles (with a 500 nm scale bar)
Figure 5B:
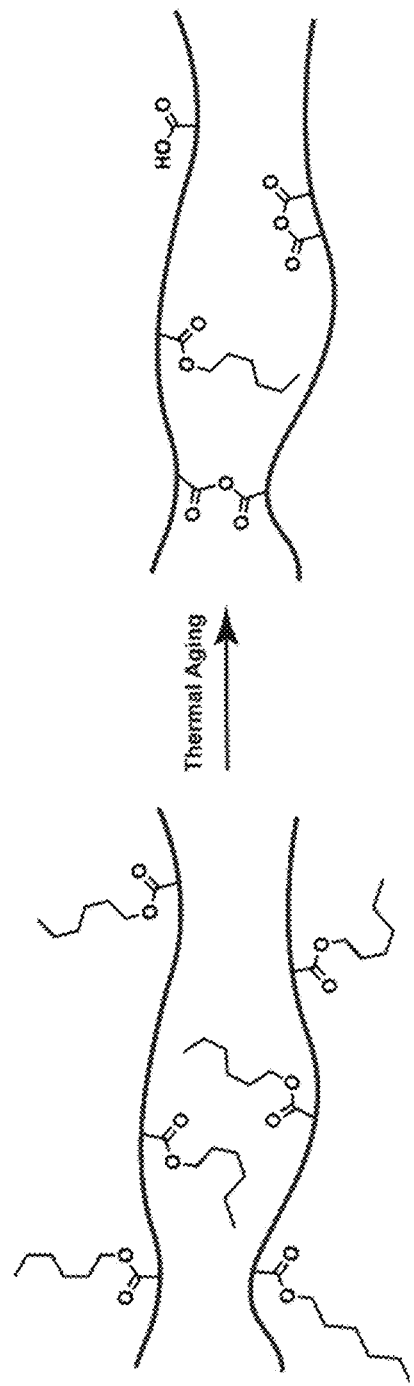
FIG. 5B shows, according to some embodiments, a schematic diagram of the thermal aging of polymer grafted particles.

To study the effect of thermal aging on PGNPs, a series of methacrylate polymers were prepared using a "grafting-from" approach via surface-initiated atom transfer radical polymerization (SI-ATRP) from initiator functionalized silica nanoparticles ($SiO_2$ NPs). These NPs were prepared via the Stöber method and functionalized with a silane molecule containing a bromoisobutyrate fragment for ATRP initiation. Poly(n-hexyl methacrylate) (PnHMA), poly(n-butyl methacrylate) (PnBMA), and poly(ethyl methacrylate) (PEMA) polymers were grown from these NPs (see FIGS. 5A-5B). Linear polymers without NPs were also prepared by ATRP for comparison. PGNP samples in this work are denoted by polymer type and silica content (wt. %) (e.g., $SiO_2$-g-PHMA-48 has a PnHMA graft and 48 wt % silica NPs); information for all samples is provided in Table 1.

TABLE 1

Composition of PGNPs and linear polymers, including number average molecular weight (Mn) and dispersity (Đ) of polymer chains and the diameter and grafting density of NP cores.

| Sample ID | Monomer | Polymer $M_n$ (kDa) | Polymer Đ ($M_w/M_n$) | NP Diameter (nm) | % $SiO_2$ (wt. %) | Graft Density (chain/nm²) |
|---|---|---|---|---|---|---|
| $SiO_2$-g-PHMA-19 | nHMA | 108.1 | 1.20 | 63 | 19.0 | 0.49 |
| $SiO_2$-g-PHMA-20 | nHMA | 112.3 | 1.23 | 63 | 19.9 | 0.44 |
| $SiO_2$-g-PHMA-26 | nHMA | 74.7 | 1.23 | 63 | 26.3 | 0.46 |
| $SiO_2$-g-PHMA-38 | nHMA | 47.9 | 1.29 | 63 | 37.6 | 0.41 |
| $SiO_2$-g-PHMA-40 | nHMA | 47.9 | 1.34 | 63 | 40.1 | 0.37 |
| $SiO_2$-g-PHMA-41 | nHMA | 44.7 | 1.25 | 63 | 40.9 | 0.38 |
| $SiO_2$-g-PHMA-48 | nHMA | 35.9 | 1.26 | 63 | 47.5 | 0.36 |
| $SiO_2$-g-PBMA-38 | nBMA | 41.4 | 1.16 | 51 | 37.9 | 0.38 |
| $SiO_2$-g-PEMA-35 | EMA | 45.0 | 1.19 | 51 | 34.9 | 0.47 |
| Linear PHMA | nHMA | 46.0 | 1.12 | — | — | — |
| Linear PBMA | nBMA | 38.0 | 1.07 | — | — | — |
| Linear PEMA | EMA | 37.0 | 1.03 | — | — | — |

Thermogravimetric analysis (TGA) of PGNPs ($SiO_2$-g-PHMA-38, $SiO_2$-g-PBMA-38, and $SiO_2$-g-PEMA-35) and linear polymers in air revealed that the temperature at which the polymer chains underwent substantial decomposition was elevated for PGNPs compared to linear polymers, although all grafted polymers exhibited small mass losses prior to the onset of rapid decomposition in their linear counterparts, which may be attributed to residual solvent (FIGS. 6A-6B). The delay in the onset of significant mass loss to over ~300° C. suggests that a processing window exists for thermoforming PGNPs below 200° C. without significantly altering the properties or behavior of the polymer chains.

Figure 7:
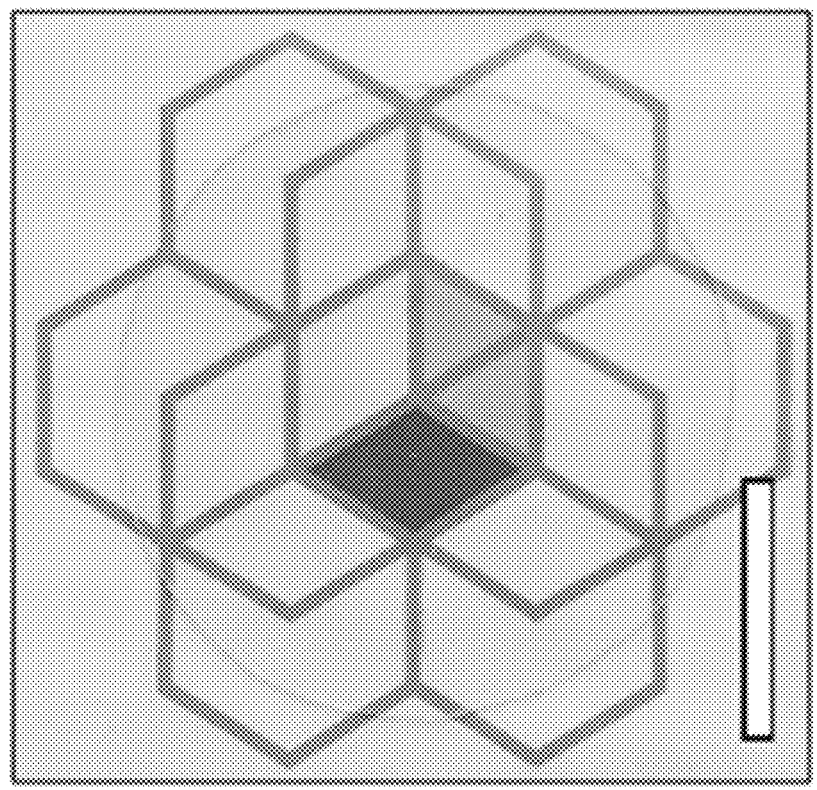
FIG. 7 shows, according to some embodiments, an approximately 0.5 mm thick film of a particulate/polymer composite after hot pressing.

The chemical transformations occurring at elevated temperatures correspond to reactions that should both remove mass associated with the organic content of the composite (increasing inorganic filler vol. %) and also covalently crosslink adjacent polymer chains (which should strengthen interparticle interactions). PGNP samples ($SiO_2$-g-PHMA-38, $SiO_2$-g-PBMA-38, and $SiO_2$-g-PEMA-35) were pressed into films at 150° C. (~0.5 mm thick, FIG. 7) and heated from 50 to 200° C. under vacuum (−30 in Hg) in an oven before releasing vacuum and continuing to age the films at 200° C. under ambient atmosphere. The mass losses of the films were recorded, and chemical changes were monitored with attenuated total reflectance (ATR) FTIR and compared to linear polymer controls.

Figure 8:
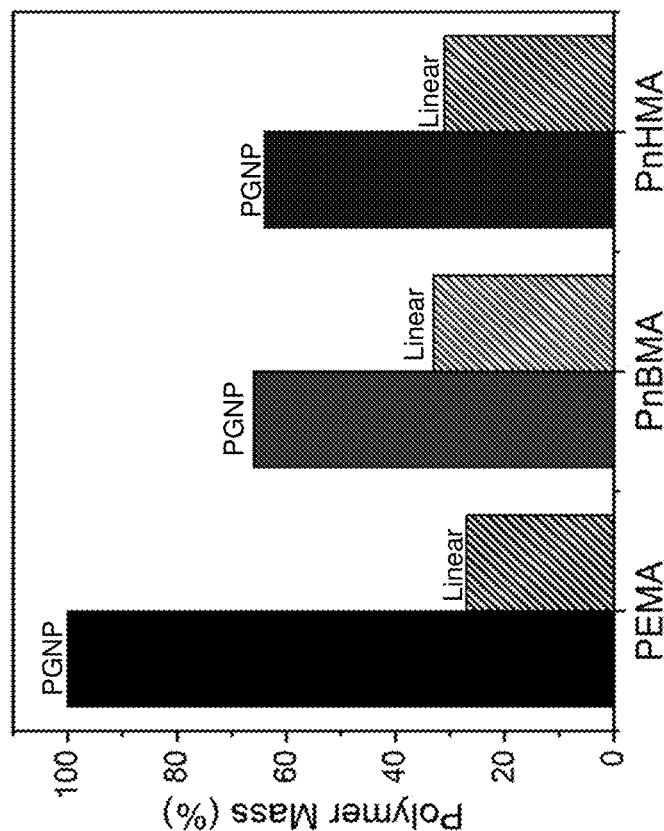
FIG. 8 shows, according to some embodiments, the mass loss of polymer grafted particles compared to liner polymers after thermally aging for 24 hours.
Figure 9A:
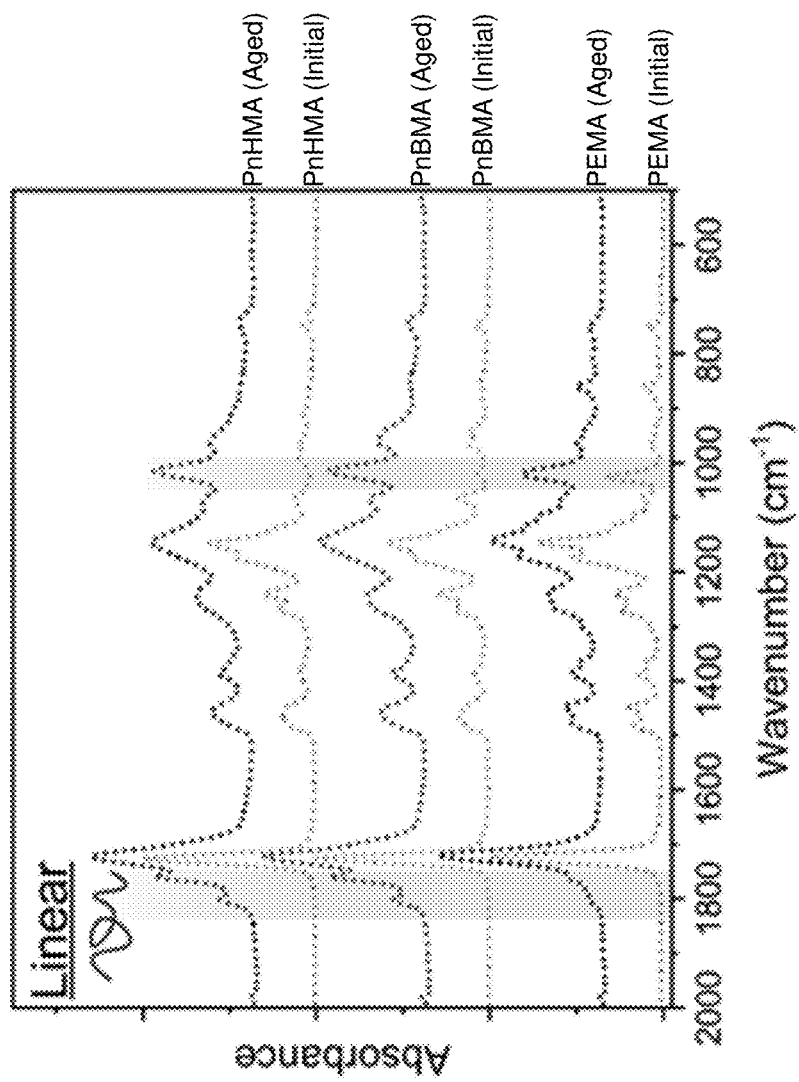
FIG. 9A shows, according to some embodiments, attenuated total reflection (ATR) Fourier transform infrared spectroscopy (FTIR) of linear polymers.
Figure 9B:
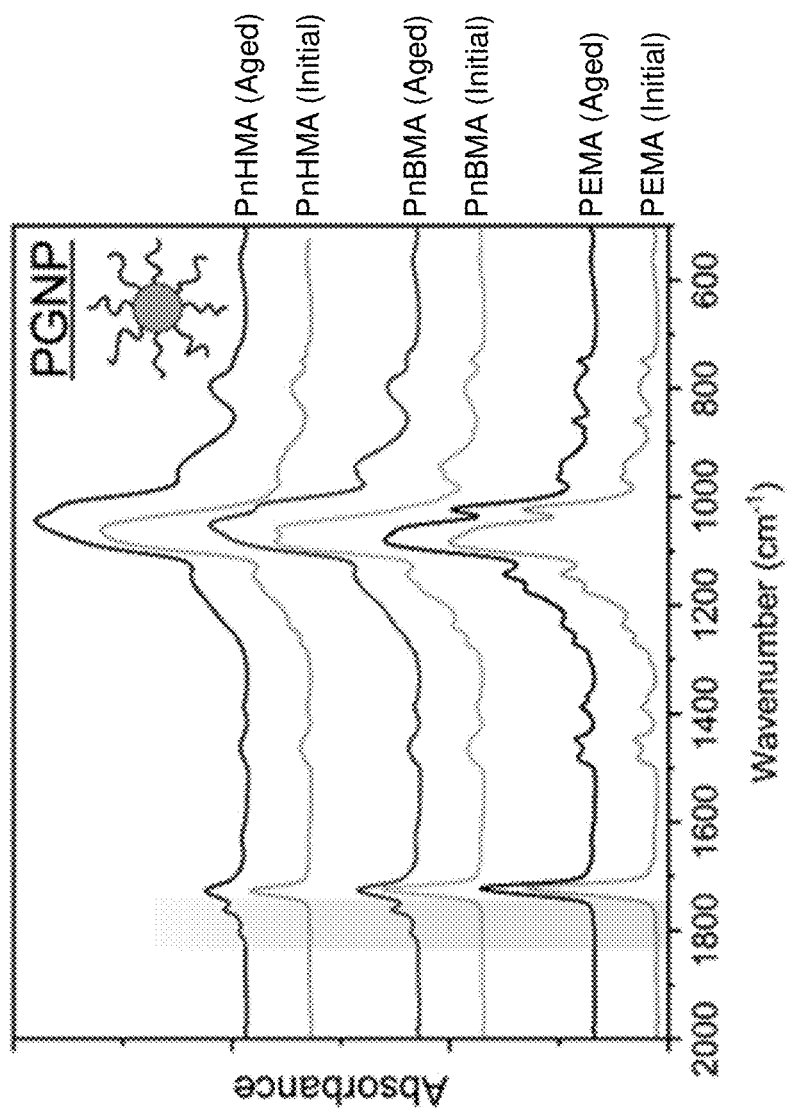
FIG. 9B shows, according to some embodiments, ATR FTIR of polymer grafted particles.
Figure 10:
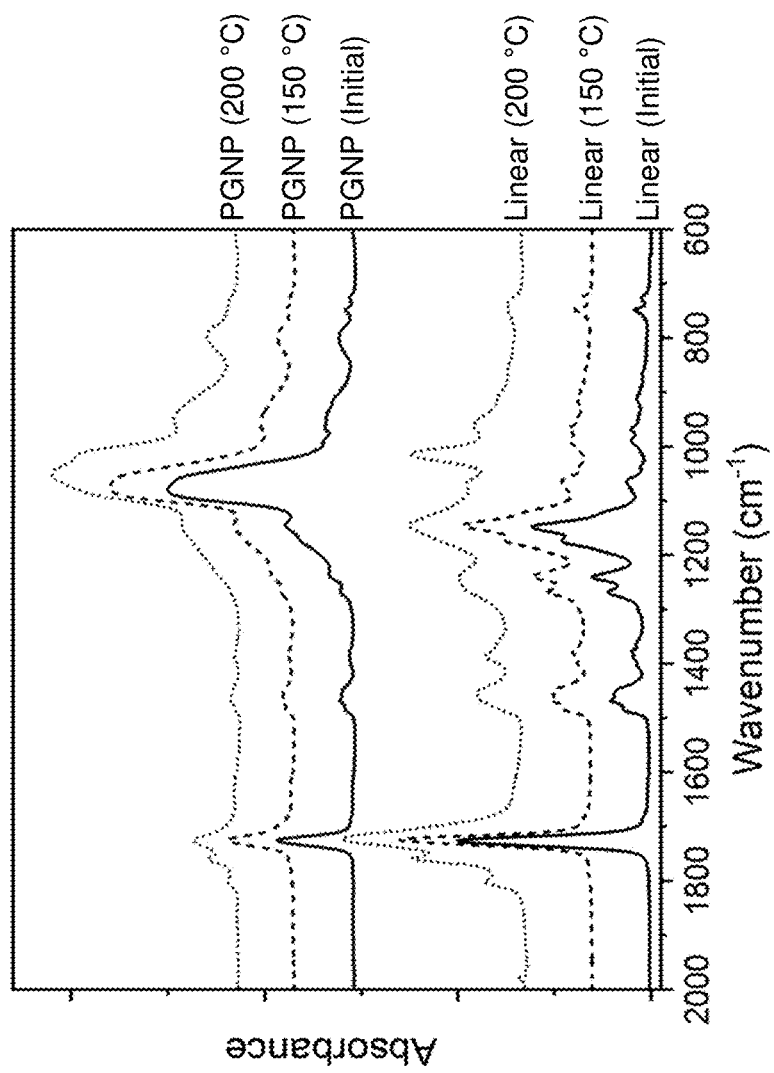
FIGS. 10-11 show, according to some embodiments, ATR FTIR of polymer grafted particles compared to liner polymers after thermally aging for 24 hours.

After 24 hours at 200° C., all linear polymers lost approximately 70% of their mass, while PnBMA and PnHMA PGNPs lost about 35% of their polymer mass, and the PEMA PGNP sample exhibited no loss (FIG. 8). FTIR indicated the presence of anhydrides (peaks at 1760 and 1800 $cm^{-1}$) in aged linear and grafted PnBMA and PnHMA, with smaller peaks for linear PEMA, and no indication of anhydride formation in PEMA PGNPs (FIGS. 9A-9B). In comparison, aging linear and grafted PnHMA at 150° C. under air did not result in the formation of anhydrides (FIG. 10), and the samples exhibited significantly less mass loss (10.8% and 4.2% of polymer mass for linear PnHMA and $SiO_2$-g-PHMA-38, respectively). In all cases where anhydrides were observed, the lower wavenumber peak (1760 $cm^{-1}$) was more prominent than the higher wave number peak (1800 $cm^{-1}$) indicating that the anhydrides were primarily cyclic (i.e., formed between adjacent residues on the same chain). However, even a small portion of non-cyclic anhydrides has been found to render aged materials insoluble, indicating crosslinking. Given that even the PGNP with the least organic content ($SiO_2$-g-PHMA-48) contains nearly a million residues per particle that can participate in crosslinking, these results indicate a high likelihood of forming a percolating crosslinked network between PGNPs. Further evidence was found using solid-state $^{13}C$-NMR of $SiO_2$-g-PHMA-19, which revealed a composition of ~36% anhydride after 24 hours of aging based on the relative areas of the carbonyl group peaks. Importantly, this significant fraction of transformed methacrylate monomers indicates that the aging process occurred throughout the film and was not localized to the surface. Collectively, these results demonstrate that it is possible to thermally age PGNPs with low $T_g$ methacrylic grafted chains resulting in the formation of anhydride linkages and a reduction of the organic component of the composite.

Figure 11:
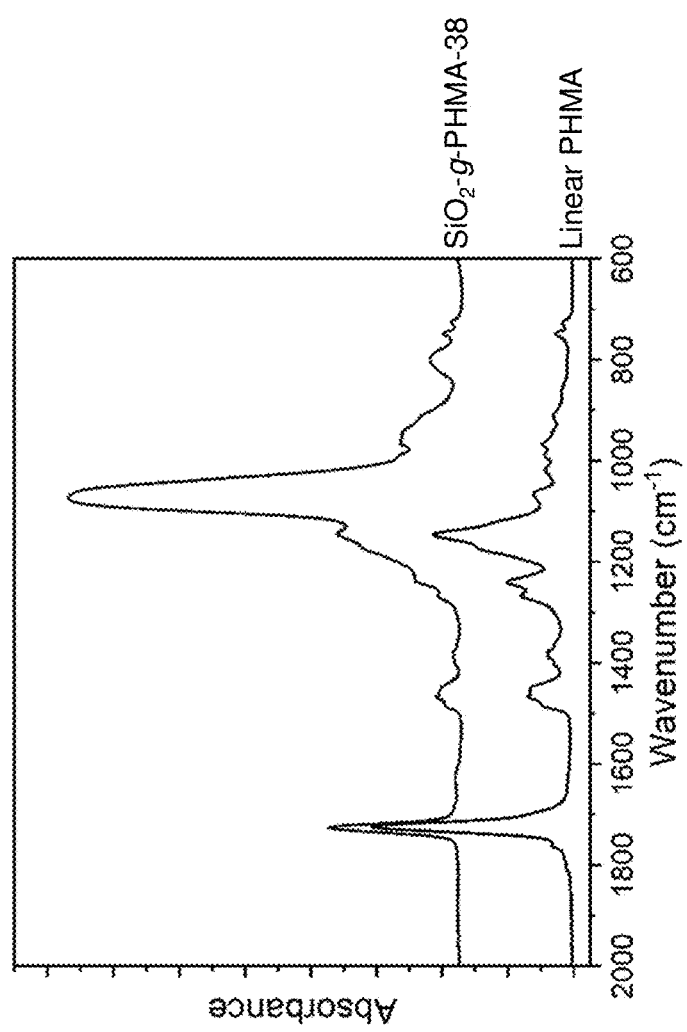

Notably, PnHMA PGNPs and linear polymer cured at 200° C. for 24 hours under vacuum also did not form significant anhydrides (FIG. 11). These data indicate that anhydride formation and depolymerization are significantly accelerated by the presence of air, but slow aging is possible below the onset of rapid decomposition. To further support these hypotheses regarding the chemical transformations occurring during thermal aging, a mass spectrometer coupled to TGA was used to determine the masses of the reaction products being lost during thermal aging of $SiO_2$-g-PHMA-19 at 200° C. in air. Fragments were detected that were characteristic of the alcohol or alkene fragments that would be expected from ester decomposition, as well as fragments characteristic of the monomer due to depolymerization, with no such fragments or mass loss observed under a helium atmosphere. This finding is particularly important to the development of aging procedures given the wide range of temperatures and environments present in the existing literature and the postulation of both aerobic and anaerobic mechanisms for the aging of polymethacrylate materials.

Figure 12A:
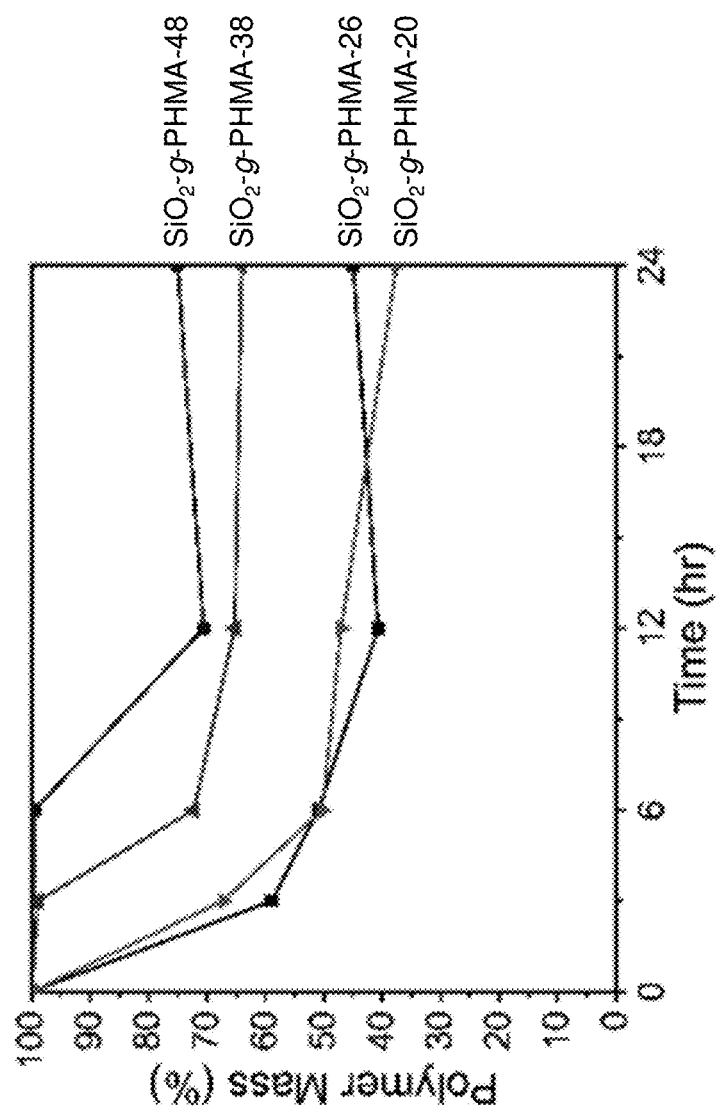
FIG. 12A shows, according to some embodiments, the change in polymer content for polymer grafted particles as a function of time.

In order to determine the compositional limits of the aging process and investigate whether or not filler loading plays a role in aging, a series of PnHMA PGNPs were synthesized with varying lengths of grafted chains chosen such that the silica fraction ranged from ~20 to 50 wt. %. PnHMA was selected because the lower $T_g$ polymer facilitated thermal processing. These samples were pressed at 150° C. into ~0.5 mm thick free-standing films, and portions of the films were aged in air at 200° C. for varying lengths of time up to 24 hours (FIG. 12A).

Figure 12B:
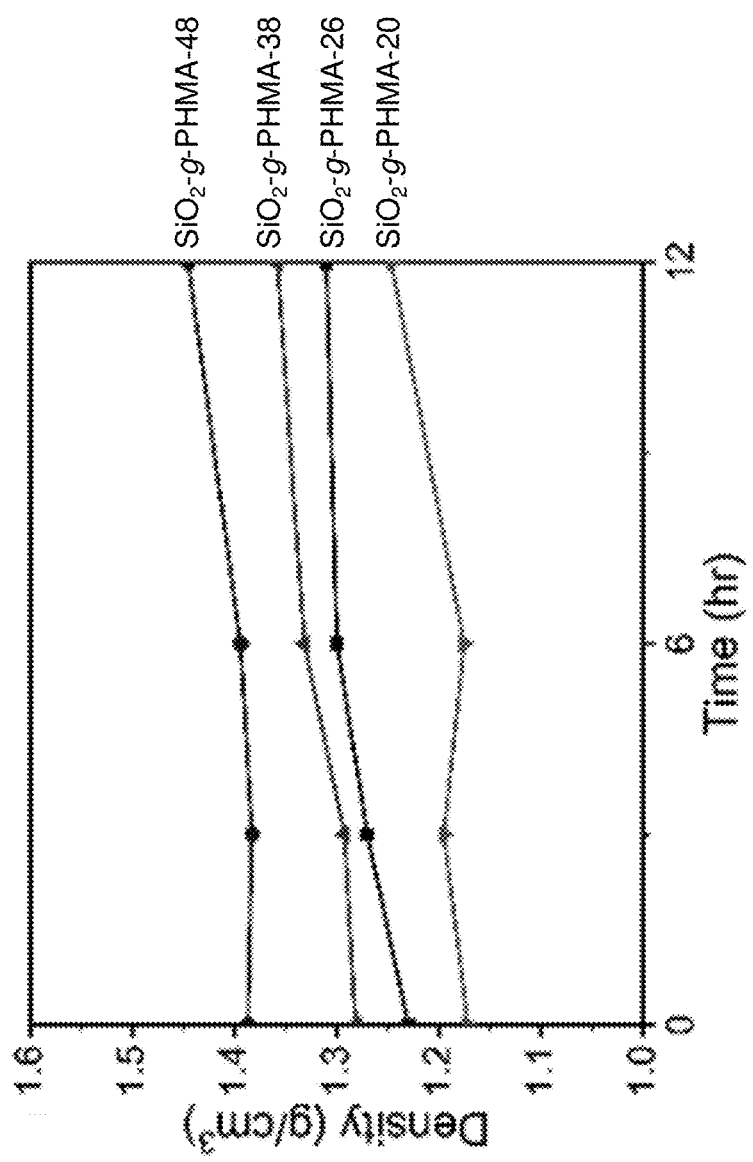
FIG. 12B shows, according to some embodiments, the change in density for polymer grafted particles as a function of time.
Figure 12C:
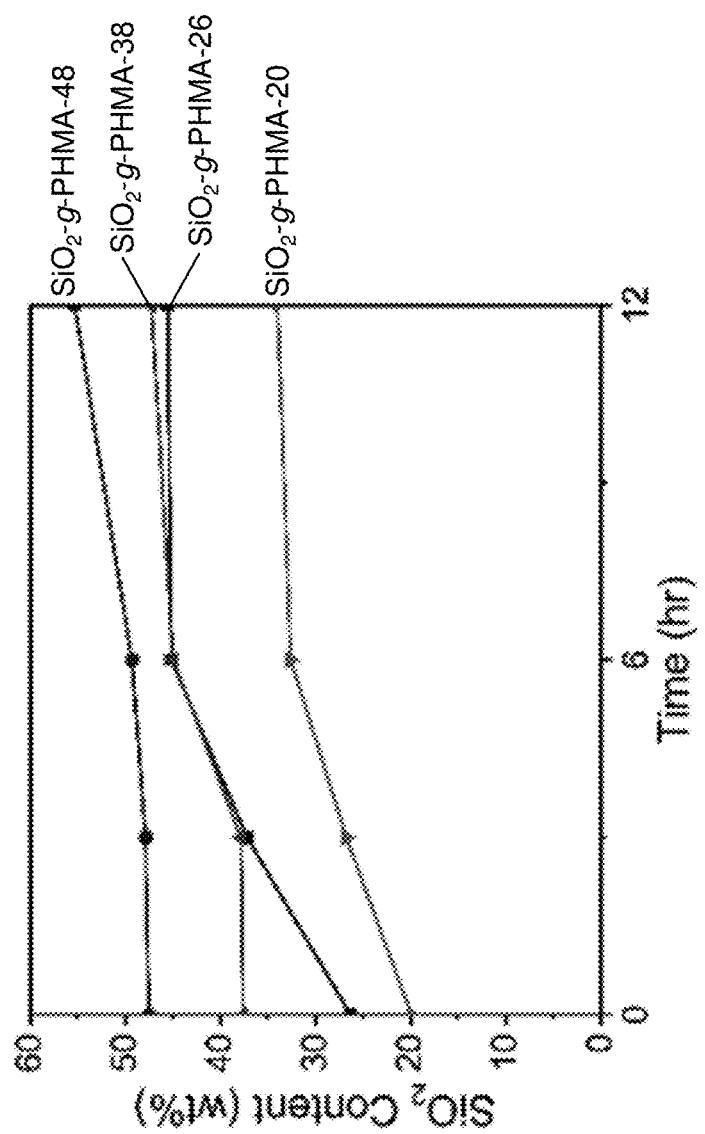
FIG. 12C shows, according to some embodiments, the change in filler loading for polymer grafted particles as a function of time.

As samples were aged, the films transitioned from a flexible, tacky material into a more rigid composite, with little change in mass after 12 hours. Samples with a lower filler content were found to undergo aging faster (as indicated by a more rapid weight loss), and also exhibit a larger increase in silica content (FIGS. 12A and 12C). In addition, during aging, the samples change from nearly colorless to a deep reddish brown, which is attributed to the oxidation of residual copper from the polymerization that was difficult to fully remove due to the porous nature of the silica particles. Importantly, the color change could in principle be eliminated by using less porous particles or by synthesizing the polymers using metal-free ATRP.

Figure 13B:
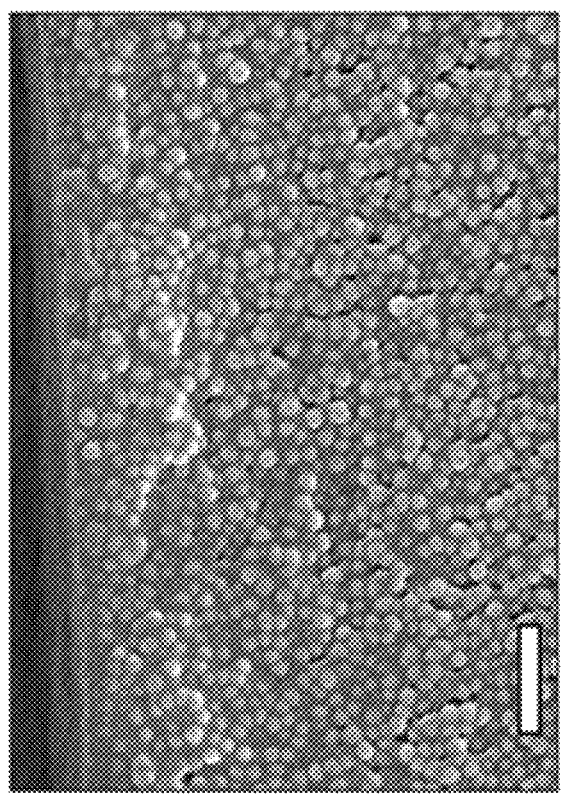
FIG. 13B shows, according to some embodiments, a SEM image of a cross-section of a film comprising a particulate/polymer composite.
Figure 13A:
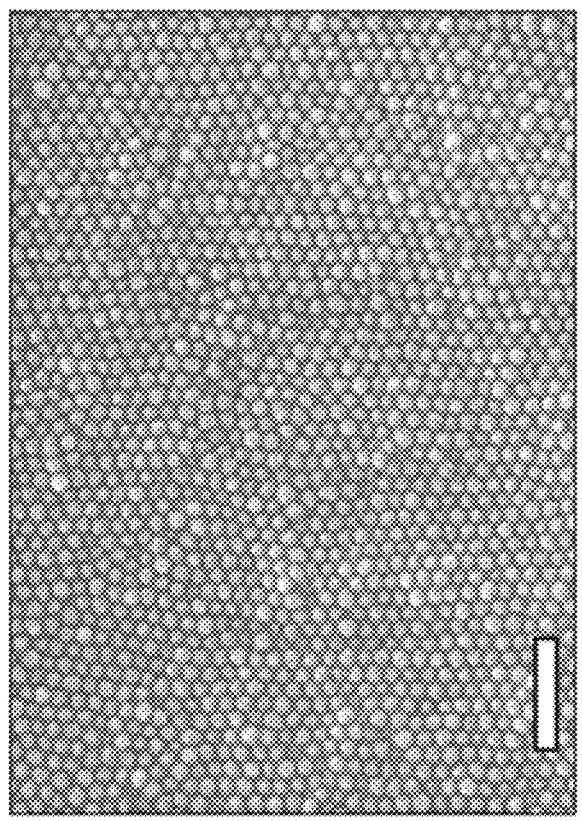
FIG. 13A shows, according to some embodiments, a SEM image of a face of a film comprising a particulate/polymer composite.
Figure 14:
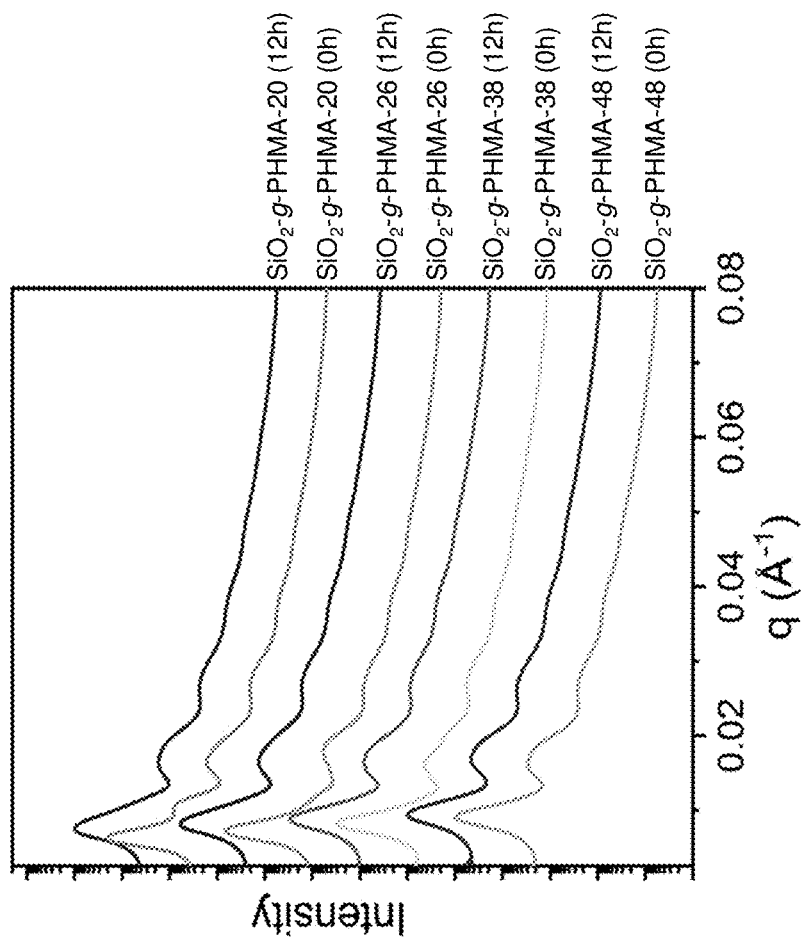
FIG. 14 shows, according to some embodiments, small-angle X-ray scattering (SAXS) of polymer grafted particles.

An important question regarding the thermal aging of PGNPs is whether or not the samples remain dense during polymer decomposition, or if this process results in void spaces. Sample dimensions and masses were used to calculate approximate densities as a function of thermal treatment (FIG. 12B), and density was found to increase during aging. In addition, SEM imaging of the surfaces of films cured for 12 hours showed no evidence of microscopic porosity at the surface (FIG. 13A). Small defects are visible in cross-sections of cured films prepared by cryo-microtome, but these may be an artifact of the cutting process (FIG. 13B). In general, no evidence of large voids was found, suggesting that the films remained dense throughout the aging process. Furthermore, small-angle X-ray scattering (SAXS) experiments showed a decrease in interparticle spacing (shift of primary peak to higher q) for all samples after aging for 12 hours, without significant peak broadening, which is also consistent with densification of the composites (FIG. 14 and Table 2).

TABLE 2

Interparticle spacing determined from q0 peak as d = 2π/q without form factor correction. SiO2 NP core diameter was 63 nm.

| Aging Time (h) | Interparticle spacing (nm) | | | |
| --- | --- | --- | --- | --- |
| | $SiO_2$-g-PHMA 20 | $SiO_2$-g-PHMA 26 | $SiO_2$-g-PHMA 38 | $SiO_2$-g-PHMA 46 |
| 0 | 102.7 | 87.1 | 76.4 | 69.3 |
| 12 | 84.3 | 76.4 | 71.6 | 67.0 |

Figure 15:
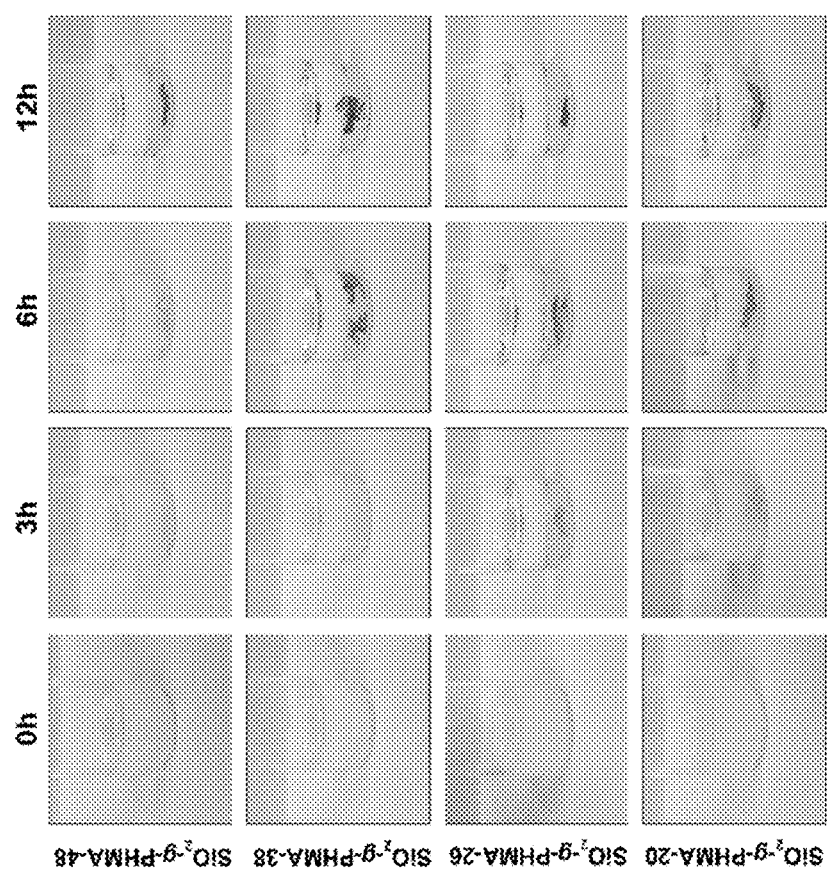
FIG. 15 shows, according to some embodiments, photographs of unaged polymer grafted particles (0 hours) and thermally aged polymer grafted particles (3-12 hours) immersed in methyl ether ketone (MEK)
Figure 16A:
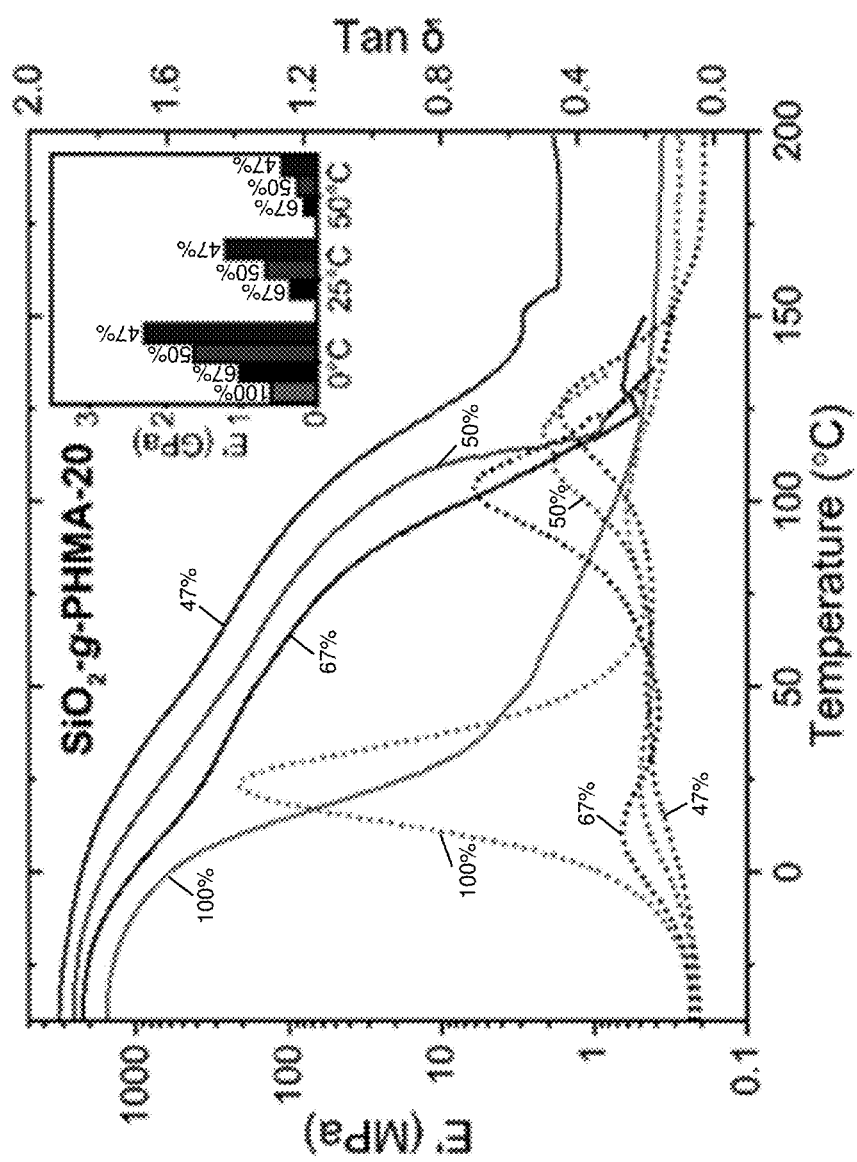
FIGS. 16A-16D show, according to some embodiments, a dynamic mechanical analysis (DMA) temperature-sweep of thermally aged polymer grafted particles.
Figure 16B:
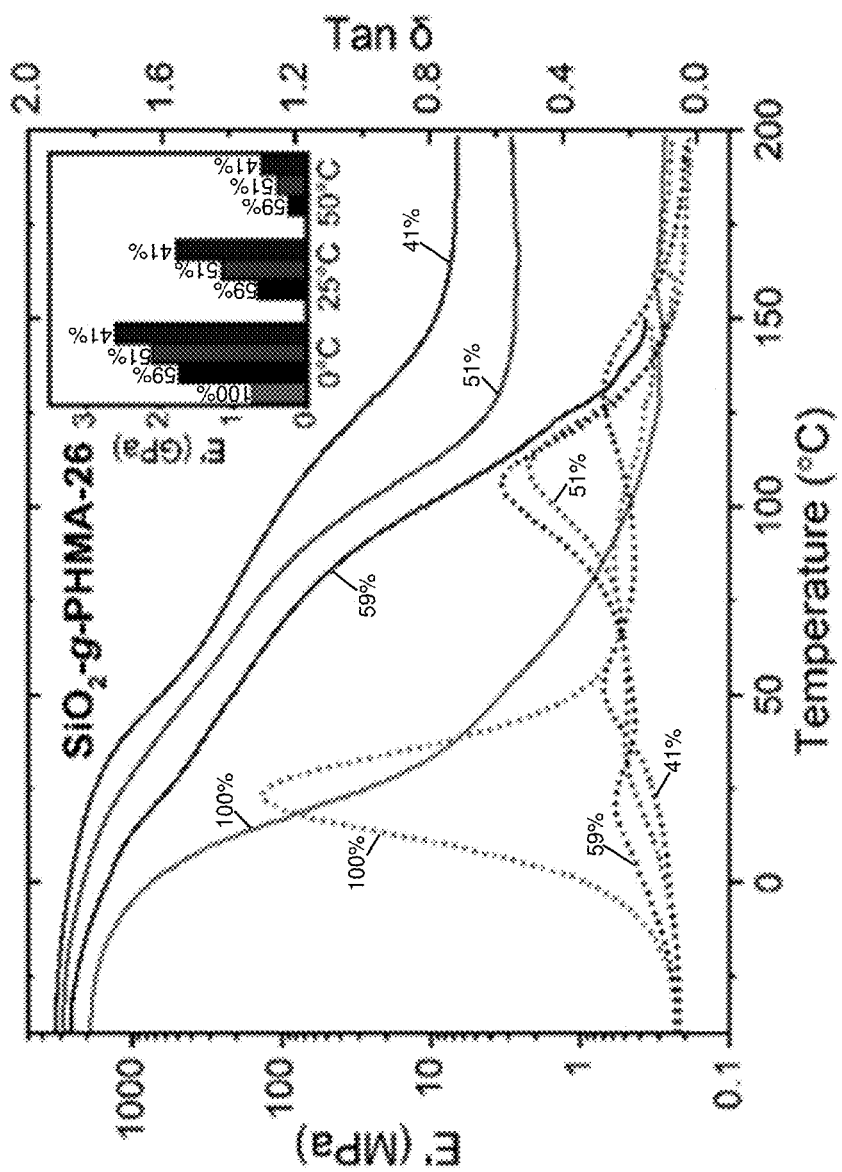
Figure 16C:
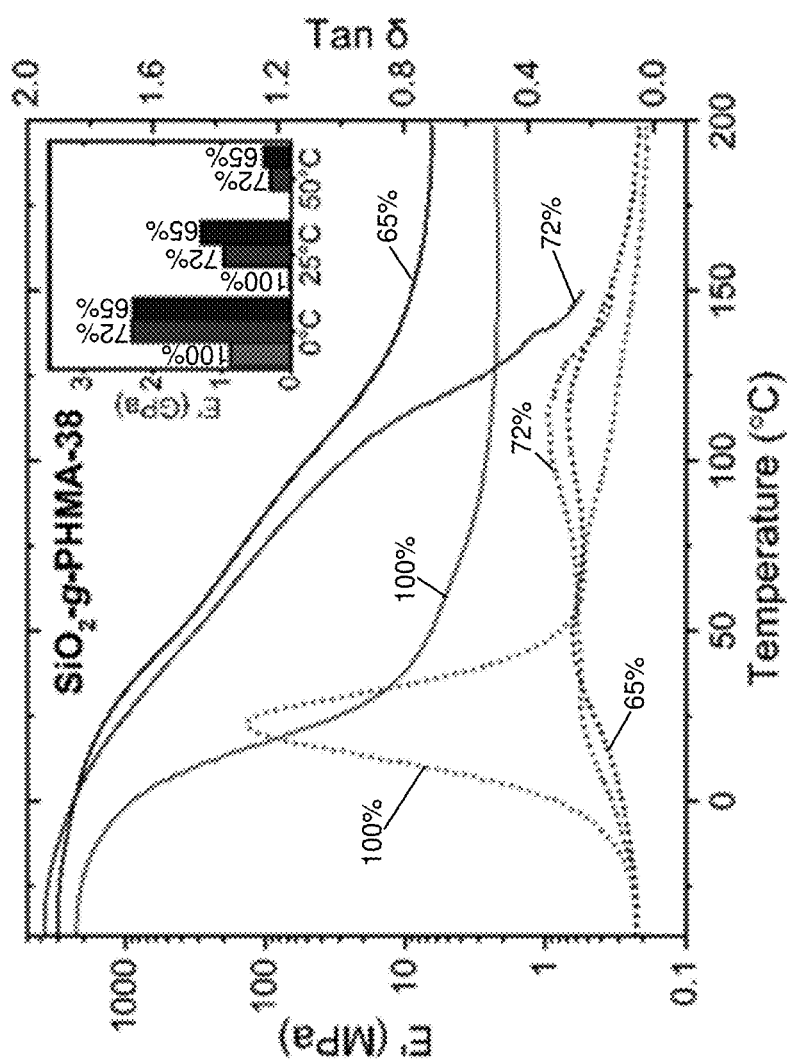
Figure 16D:
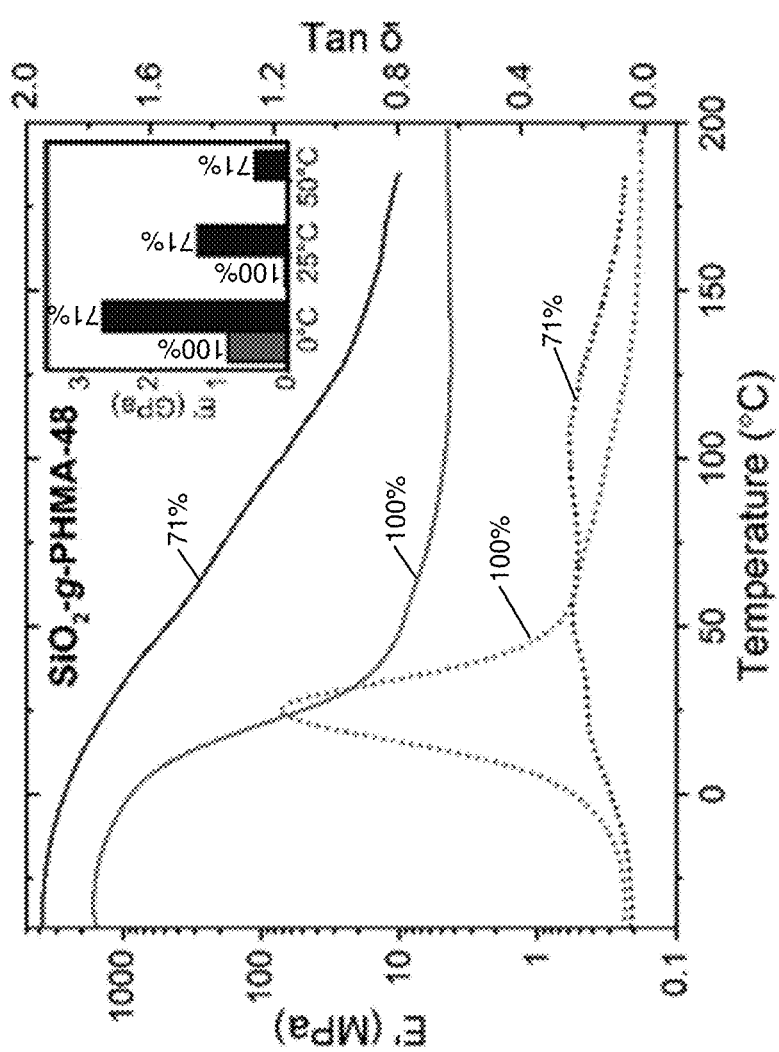
Figure 17B:
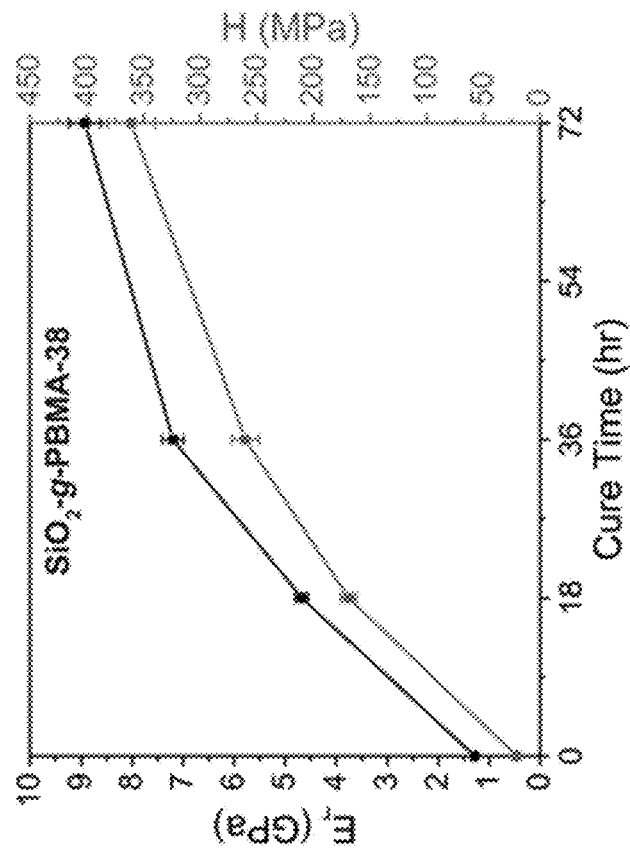
FIGS. 17A-17B show, according to some embodiments, the reduced modulus and hardness for thermally aged polymer grafted particles.
Figure 17A:
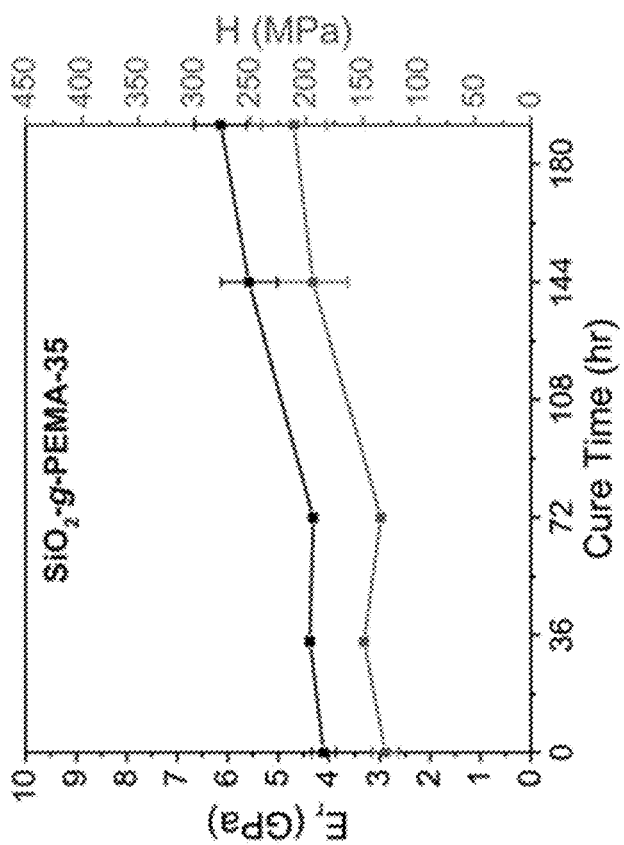
Figure 17D:
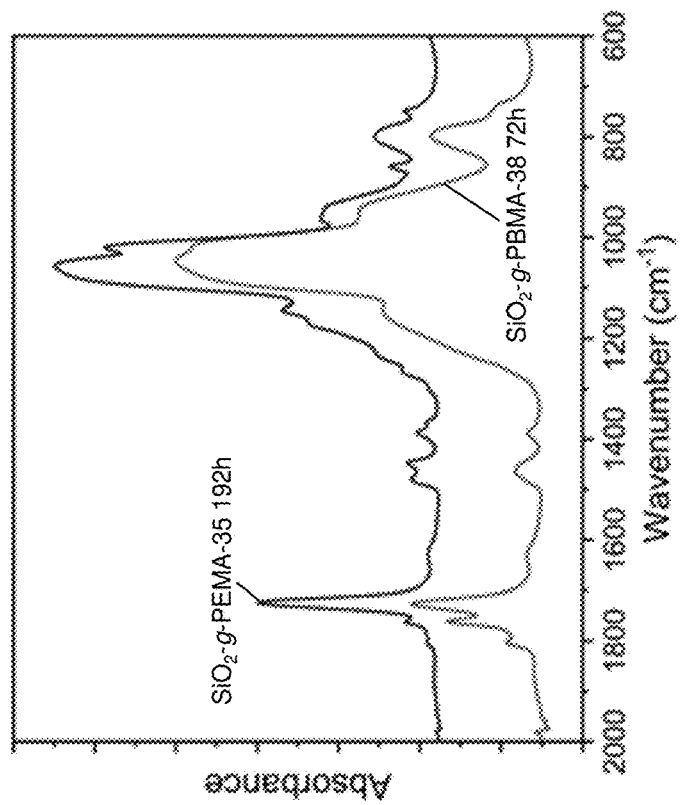
FIG. 17D shows, according to some embodiments, ATR FTIR of polymer grafted particles at the longest time of thermally aging shown in FIG. 17C.
Figure 17C:
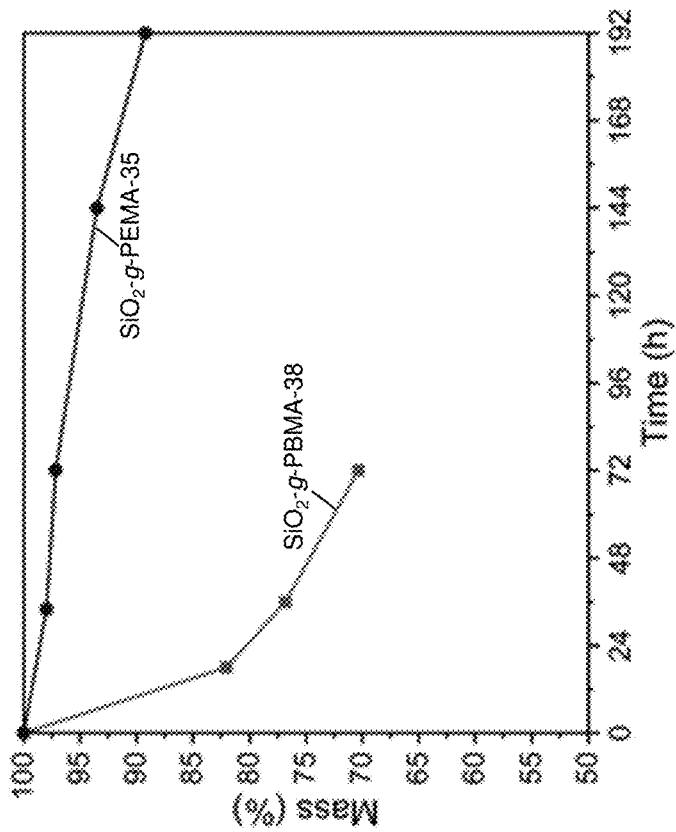
FIG. 17C shows, according to some embodiments, the mass loss in $SiO_2$ polymer grafted particles as a function of the time of thermally aging.

To further probe the stability of these materials post thermal treatment, samples of aged PGNPs were soaked in MEK to evaluate the effects of aging on solubility. After 1 week of gentle shaking at room temperature followed by 1 minute of sonication, all of the "green" samples were either completely or mostly dissolved (FIG. 15). In contrast, after aging past the point at which each material began to undergo significant mass loss, the samples remained mostly intact during the test, with all samples that were aged for 12 hours showing minimal dissolution. This decrease in solubility presents further evidence of the formation of interchain covalent crosslinks that increase the strength of interparticle interactions. In all, these results show that bulk methacrylate-based PGNPs can undergo a thermal aging process that transforms the material from a soft, soluble, and easily formable "green" state into a rigid and crosslinked plastic. Moreover, this transformation was performed without affecting the distribution of particles within the material, as evidenced by the microscopy images and x-ray scattering data. As a result, it was hypothesized that these films should have significantly improved mechanical performance due to the thermal aging process.

Alteration of composite mechanical behavior due to thermal aging was investigated by temperature-controlled dynamic mechanical analysis (DMA) of rectangular film specimens. Films were evaluated in tension (0.1% strain (0.05% for $SiO_2$-g-PHMA-48), 1 Hz, 2° C./min) from −40 to 200° C. to examine behavior both above and below the $T_g$ of PnHMA (−5° C. for the linear polymer). Only a single sample was measured at each condition given the variation in the rate of transformation during aging exacerbated by small variations in initial film thickness and heat distribution in the aging oven; future studies will evaluate the progression of aging as a function of film thickness using a convection oven for more consistent heating.

The elastic storage modulus (E') and loss factor (Tan δ) are presented in FIGS. 16A-16D for each material as a function of the remaining polymer content after aging (aged samples with insignificant mass loss are neglected). In all "green" samples, there was a large peak in loss factor at a temperature of 23-25° C. that corresponds to the glass transition of PnHMA. The peak in Tan δ is generally a higher measurement of $T_g$; a more representative measurement is a peak in loss modulus (E") which is observed between 1-7° C. (Table 3) for the uncured samples. At 25° C., "green" samples had storage moduli of 17, 22, 29, and 47 MPa for $SiO_2$-g-PHMA-20, -26, -38, and -48, respectively, which is similar to the reported value of 25 MPa for linear PnHMA. As aging progressed, the initial peak in loss factor diminished and shifted to higher temperatures, and, simultaneously, a new peak appeared at higher temperatures (104-106° C.) which also diminished and shifted to higher temperatures with continued aging. This second peak in loss tangent was attributed to the formation of poly(methyl anhydride) ($T_g$ ~159° C.) resulting from ester side chain decomposition. A corresponding peak in E" is not observed, although the initial peak broadens significantly and shifts to higher temperatures (10-34° C.).

TABLE 3

Tg for PGNPs as a function of aging time determined both by peak in loss factor (Tan δ) and peak in loss modulus (E"). If two peaks were present, the higher amplitude peak is underlined.

| Aging | | Peak Location (° C.) | | | |
|---|---|---|---|---|---|
| Time (h) | Method | $SiO_2$-g-PHMA 20 | $SiO_2$-g-PHMA 26 | $SiO_2$-g-PHMA 38 | $SiO_2$-g-PHMA 46 |
| 0 | Tan δ | <u>24</u>, 99 | <u>23</u>, 86 | 23 | 25 |
|   | E" | 1 | 2 | 2 | 7 |
| 3 | Tan δ | 11, <u>104</u> | 21, <u>106</u> | — | — |
|   | E" | −2 | 5 | 2 | 5 |
| 6 | Tan δ | 24, <u>119</u> | 36, <u>110</u> | 31, <u>106</u> | — |
|   | E" | 6 | 18 | 5 | 7 |
| 12 | Tan δ | 125.0 | 52, 130 | 49, <u>112</u> | 54, <u>106</u> |
|   | E" | 13 | 34 | 20 | 10 |

As aging progressed, dramatic increases in storage modulus were observed between 25 and 100° C. At room temperature (25° C.), the storage moduli for 12 hour aged samples increased to ~69×, 81×, 43×, and 28× their initial values for $SiO_2$-g-PHMA-20, -26, -38, and -48 samples, respectively. At 50° C., these figures were increased to ~165×, 189×, 61×, and 50×, respectively (Table 4). Across all samples, the temperature above which E' falls below 1 GPa increased from −11 to −2° C. to 31 to 41° C. (Table 5). These massive increases in modulus indicate that aging transforms the initially malleable composite into a rigid material at typical operating temperatures, and these large increases cannot be explained by an increase in organic content due to de-polymerization alone, indicating that partial conversion of ester side-chains to anhydrides occurs throughout the material. Samples aged for 12 hours also had a higher plateau modulus at higher temperatures, providing another indication of crosslinking.

TABLE 4

Storage modulus (E') determined by DMA of PGNP films as a function of aging time.

| Aging | E' (MPa) | | | | | | | | | | | |
|---|---|---|---|---|---|---|---|---|---|---|---|---|
| Time | $SiO_2$-g-PHMA-20 | | | $SiO_2$-g-PHMA-26 | | | $SiO_2$-g-PHMA-38 | | | $SiO_2$-g-PHMA-48 | | |
| (hour) | 0° C. | 25° C. | 50° C. | 0° C. | 25° C. | 50° C. | 0° C. | 25° C. | 50° C. | 0° C. | 25° C. | 50° C. |
| 0 | 610 | 17 | 2.8 | 750 | 22 | 3.3 | 860 | 29 | 6.3 | 870 | 47 | 9.6 |
| 3 | 1000 | 340 | 160 | 1700 | 670 | 25 | — | — | — | — | — | — |
| 6 | 1600 | 670 | 260 | 2100 | 1200 | 410 | 2300 | 990 | 310 | — | — | — |
| 12 | 2200 | 1200 | 460 | 2600 | 1800 | 630 | 2200 | 1240 | 390 | 2700 | 1300 | 480 |

Values extracted from a single temperature sweep and rounded to two significant figures.

TABLE 5

Storage modulus (E') determined by DMA of PGNP films as a function of aging time.

| Aging Time (h) | Maximum Temperature for E' > 1 GPa (° C.) | | | |
|---|---|---|---|---|
| | $SiO_2$-g-PHMA 20 | $SiO_2$-g-PHMA 26 | $SiO_2$-g-PHMA 38 | $SiO_2$-g-PHMA 48 |
| 0 | −11 | −5 | −2 | −4 |
| 3 | 1 | 13 | — | — |
| 6 | 15 | 29 | 25 | — |
| 12 | 31 | 41 | 32 | 33 |

Values extracted from a single temperature sweep and rounded to two significant figures.

To demonstrate that aging is applicable to a range of methacrylate PGNPs, smaller samples of $SiO_2$-g-PBMA-38 and $SiO_2$-g-PEMA-35 composites were analyzed via nanoindentation to measure the reduced elastic modulus ($E_r$) and hardness (H) as a function of aging time. While the requisite aging times were longer, significant enhancements in stiffness and hardness, which is correlated to strength, were realized for both polymers (see FIGS. 17A-17D). As expected given the lower starting values and faster aging for longer ester side chains, the improvements were more drastic for the PBMA PGNPs, with modulus increasing from 1.28±0.03 GPa to 8.9±0.3 GPa and hardness from 20.7±0.7 MPa to 361±21 MPa after aging for 72 hours. These significant improvements indicate the generality of this approach to PGNPs with varying graft compositions.

Figure 18A:
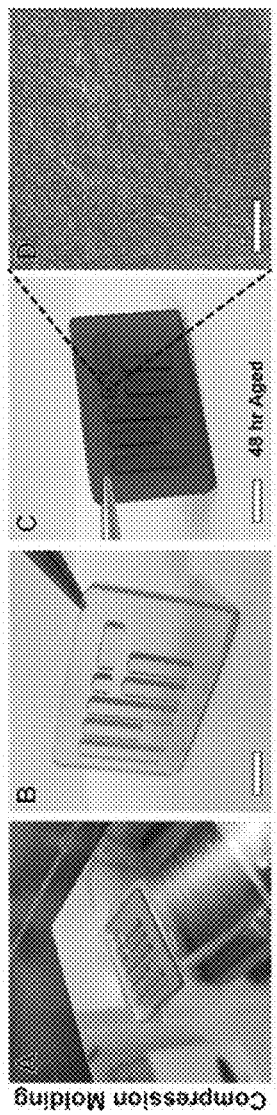
FIG. 18A shows, according to some embodiments, compression molding a composite, subsequent thermal aging, and a SEM image after 48 hours of thermal aging.
Figure 18B:
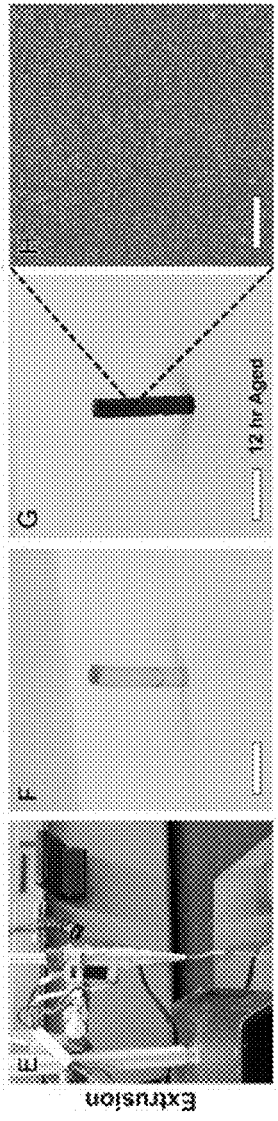
FIG. 18B shows, according to some embodiments, extruding a composite into a filament, subsequent thermal aging, and a SEM image after 12 hours of thermal aging.
Figure 18C:
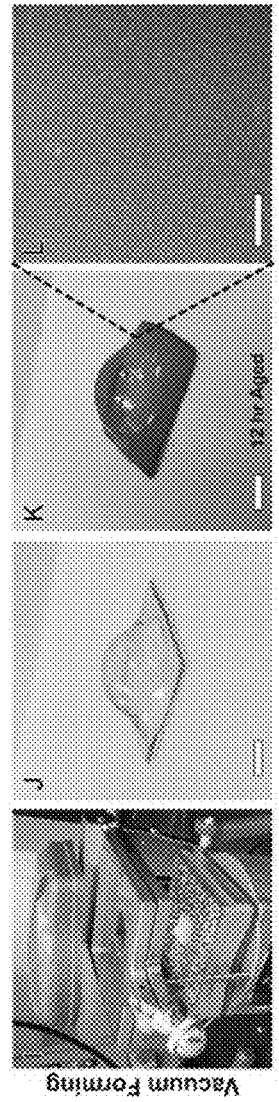
FIG. 18C shows, according to some embodiments, vacuum forming a composite, subsequent thermal aging, and a SEM image after 12 hours of thermal aging.

To date, investigations into the use of neat PGNPs as engineering materials have largely focused on thin films (often supported by a substrate), which is a limiting factor in their application. To further demonstrate the utility of this novel method for processing rigid composites with a high fraction of evenly dispersed filler particles, samples of $SiO_2$-g-PHMA were shaped via common thermoforming methods to produce macroscopic 3D shapes (FIGS. 18A-18C). Approximately 1 gram of $SiO_2$-g-PHMA-41 was compression molded at 150° C. in a PFTE mold to form a freestanding copy of the MIT university logo. In another example, $SiO_2$-g-PHMA-40 was extruded at ~190° C. with a ~4:1 diameter reduction to form a 2 mm diameter composite column. Lastly a ~0.5 mm sheet of $SiO_2$-g-PHMA-20 was prepared as before by hot pressing and then subsequently vacuum formed to produce a small dome over a PTFE mold.

Figure 19B:
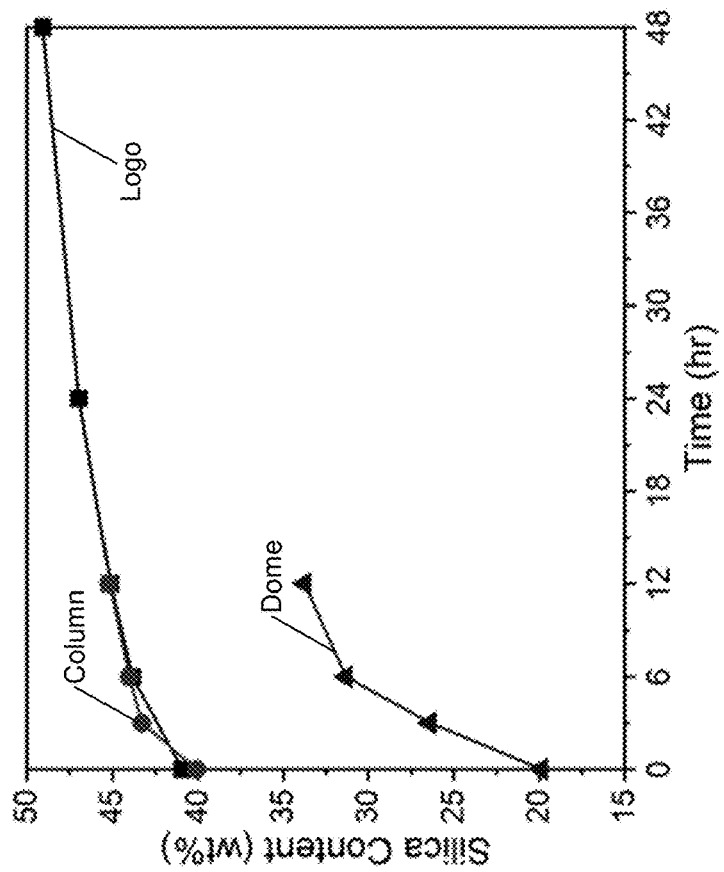
FIG. 19B shows, according to some embodiments, remaining silica content of the samples shown in FIGS. 18A-18C as a function of aging time.
Figure 19A:
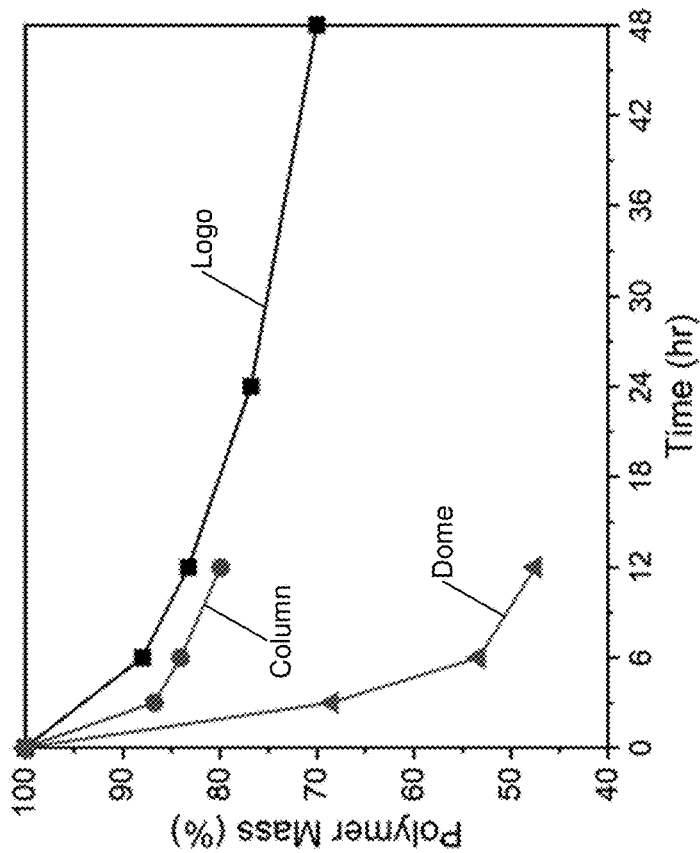
FIG. 19A shows, according to some embodiments, remaining polymer mass for the samples shown in FIGS. 18A-18C as a function of aging time.

The dome and column were aged at 200° C. for 12 hours to yield a rigid composite, while the logo was aged for 48 hours. Silica content increased from 41, 40, and 20 wt. % to 49, 45, and 34 wt. % for the logo, column, and dome, respectively (FIGS. 19A-19B). It was found that curing progressed more slowly for the thicker logo and column shapes (see mass loss in FIGS. 19A-19B), but, in all cases, SEM imaging of the aged structures showed that the dense arrangement of nanoparticles separated by polymer shells was maintained.

Transformative thermal aging of PGNPs shows significant potential as a route to produce highly-filled composites while maintaining the processing advantages of thermoplastic materials. Although anhydride formation has been investigated for linear polymers, the PGNP architecture allows for uniform filler distribution with no aggregation or mixing steps. Using this approach, a particle composition can be selected to yield a desired property and then grafted with a commercially available methacrylate polymer using established polymerization or grafting methods to yield a low $T_g$ single-component composite material. The material can then be shaped by traditional polymer thermoforming methods into whatever geometry is necessary for the application, and the "green" part subsequently aged at elevated temperatures to yield a rigid composite with a higher filler loading and elevated functionality. This method combines the rapid processability of polymers with the wide range of utility of inorganic materials and represents a significant step towards the application of PGNPs as designer composites.

Chemicals were purchased from Fisher or Alfa Asear. Monomers were filtered through a plug of basic alumina and stored in a freezer prior to use. All other chemicals were used as received. Pressed samples were stored under vacuum until used.

Silica Synthesis: Silica nanoparticles were prepared via the Stöber method and then immediately functionalized with (2-bromo-2-methyl)propionyloxyhexyltriethoxysilane (BHE) in the same flask. Particles were purified by repeated centrifugation and kept as a stock solution in anisole.

Polymerization: In a typical PGNP synthesis, 7.4 g of 6.5 wt. % $SiO_2$-BHE NP solution in anisole (19 µmol), 14.9 mL of n-hexyl methacrylate (76 mmol), 3.4 mg $CuBr_2$ (as a 20 mg/mL solution in DMF; 15 µmol), 16 µL of pentamethyl-diethylenetriamine (PMDETA) (76 µmol), and 8 mL of anisole (50 vol. %) were combined in a 50 mL Schlenk flask. The flask was degassed by five freeze-pump-thaw cycles prior to backfilling with $N_2$ gas. A $N_2$ purged solution of tin(II) 2-ethylhexanoate ($Sn(EH)_2$) in anisole (20.45 mg/mL) was injected into the flask via a $N_2$ purged needle (0.3 mL; 15 µmol). The flask was then lowered into a 60° C. oil bath, and the reaction mixture was magnetically stirred. Reaction progress was monitored by removing small aliquots via $N_2$ purged syringe and measuring the wt. % of solids using an analytical balance. The reaction was quenched at a desired conversion by cooling in liquid nitrogen and opening to air. PGNPs were purified by precipitation into methanol, followed by three cycles of centrifugation and dispersion in MEK and a final precipitation in methanol. The purified material was dried under vacuum to <100 mTorr at 50° C. In a typical linear polymer synthesis, 6.2 µL of ethyl bromoisobutyrate (42 µmol), 8.3 mL of n-hexyl methacrylate (42 mmol), 0.25 mg $CuBr_2$ (as a 20 mg/mL solution in DMF; 21 µmol), 6.7 µL of hexamethyl-triethylenetetramine (HMTETA) (23 µmol), and 16.7 mL of anisole (67 vol. %) were combined in a 50 mL Schlenk flask which was degassed by four freeze-pump-thaw cycles. On the last cycle, the flask was backfilled with $N_2$ while frozen, and 3.0 mg (21 µmol) of CuBr was added while purging the flask with $N_2$. The flask was then resealed, cycled between vacuum and $N_2$ three times, and placed in an oil bath at 50° C. Reaction progress was monitored by tracking the monomer to solvent ratio with $^1$H-NMR. The reaction was quenched by cooling with liquid nitrogen and opening to air, and the product was purified by three cycles of precipitation in methanol and redispersion in MEK, followed by drying under vacuum. PGNPs and linear polymers using other monomers were prepared in the same way.

GPC: Samples were prepared for GPC by etching ~25 mg of PGNP in a solution of 2:1 THF/HF overnight (~3 mL). The etching solution was quenched with ammonia solution (28%) while frozen with liquid nitrogen, and the organic layer was removed after thawing and dried over magnesium sulfate. Samples were analyzed using an Agilent 1260 Infinity II system with a multidetector suite equipped with two sequential Agilent ResiPore columns using a THF eluent at 40° C. with a flow rate of 1 mL/min. Absolute molecular weights were determined using refractive index and right-angle light scattering (RALS) detectors. Incremental refractive index (dn/dc) values of 0.076, 0.078, and 0.071 mL/g were used for PEMA, PnBMA, and PnHMA, respectively, as measured with linear polymer samples. For most etched samples, a high molecular weight shoulder was observed, which was attributed to either incomplete etching given the non-polar nature of hexyl methacrylate or to termination by coupling during polymerization.

Sample Pressing: PGNP films were prepared by pressing on a Carver 4386 press at 150° C. between mirror-finish stainless-steel plates separated by a 0.5 mm ring shim at a maximum load of ~1000 kg. Samples were warmed in the press for 2 minutes prior to pressing. The press was water-cooled to room temperature in ~15 minutes before removing samples. The resulting flexible disks were cut into ~4 mm×20 mm strips for DMA using a set of parallel razor blades. Smaller pieces for chemical analyses were also cut using a razor blade.

Sample Curing: Samples were placed on a stainless-steel plate covered with an adhesive PTFE film that was loaded into a vacuum oven at 50° C. While under vacuum, the temperature was ramped to 200° C. over ~1 hour at −30 in Hg. At 200° C., vacuum was released, and aging was continued under ambient atmosphere with inlet and outlet valves open. Control samples (0 hour) were removed immediately upon releasing vacuum.

TGA: Sample composition and degradation temperatures were determined using a TA Instruments Discovery TGA with high-temperature platinum pans. Composition measurements were performed on precipitated PGNPs under $N_2$ gas with a 15 minute hold at 150° C. before heating to 800° C. at 15° C./min. Decomposition measurements were performed on pressed films under air with a 15 minute hold at 100° C. before heating to 800° C. at 10° C./min. For mass spectrometry of evolved gasses, a Pfeiffer Vacuum ThermoStar was used with a capillary inserted into the evolved gas heater of the TGA, a scan window from 30-90 m/z, and the slowest available scan rate (1 (m/z)/s).

FTIR: ATR FTIR was performed on a Nicolet iS50 spectrometer from 4000-525 $cm^{-1}$ using a diamond window, 128 scans, and automatic baseline and ATR correction.

DMA: DMA was conducted on a TA Instruments Q850 with a liquid nitrogen gas cooling accessory. Measurements were conducted using a film tension clamp at a dynamic strain of +/−0.1% (0.05% for 50 wt. % $SiO_2$ samples) at 1 Hz from −40° C. to 200° C. at a heating rate of 2° C./min. A 0.1 N pre-load was applied with 125% force tracking to minimize creep. Film thickness was measured using a calibrated film thickness gauge or micrometer, and width was measured with digital calipers.

TEM: TEM samples were prepared by drop casting a ~1 mg/mL solution of PGNPs in toluene onto water in a covered petri dish. After evaporation of the toluene, a carbon-coated copper TEM grid was used to scoop a layer of PGNPs from the surface of the water. Grids were imaged using an FEI Tecnai (G2 Spirit TWIN) digital TEM with an accelerating voltage of 120 kV.

SEM: SEM samples were coated with ~8 nm of gold using a Quorum Technologies SC7640 sputter coater. Images were taken on a Zeiss Sigma 300 VP field emission SEM at 10 kV with an in-lens secondary electron detector. Cross-sections were first cut with a razor blade before being cut more-smoothly on a Lecia cryo-microtome using a glass knife at −50° C. Nanoindentation: Nanoindentation was performed using a Hysitron Triboindenter with a diamond berkovich tip using a tip area function determined from indentation of fused quartz. An array of 7×7 indents was made in each sample in depth-control mode up to 800 nm. Indentation and withdrawal rates of 40 nm/s were used, with a 20 second hold at peak depth for stress relaxation. Reduced modulus and hardness were calculated from the load-depth data by Oliver-Pharr analysis in MATLAB using a rate-jump method with power function fits to both the relaxation and withdrawal segments. A plastic contact assumption was found to be appropriate for all samples.

Polymer Grafted Nanoparticle (PGNP) Characterization Calculations: The wt. % polymer of PGNPs was calculated from TGA mass loss by accounting for any mass loss during pyrolysis of the corresponding non-grafted silica core particles after functionalization with initiator. Here, wt %$_{organic}$ refers to the mass lost during TGA up to 800° C. after the hold at 150° C. to allow for evaporation.

$$wt\ \%_{polymer} = wt\ \%_{organic}(PGNP) - \\ (100 - wt\ \%_{organic}(PGNP)) * \frac{wt\ \%_{organic}(\text{silica})}{100 - wt\ \%_{organic}(\text{silica})}$$

Core NP diameter (d) was determined using ImageJ to measure the average cross-sectional area of NPs from TEM images and assuming that the particles were spherical.

$$d = 2*\left(\frac{\text{Area}}{\pi}\right)^{\frac{1}{2}}$$

In this work, silica nanoparticles with diameters of 51 nm and 63 nm were used, both with relative standard deviations (RSDs) of 9% based on measurement of at least 300 particles. Grafting density was calculated based on the wt. % polymer of PGNPs and number average molecular weight ($M_n$) of grafted polymers assuming spherical cores and a silica density ($\rho_{silica}$) of 2 $g/cm^3$.

$$\text{Graft density} = \rho_{PGNP} = \frac{\text{\# chains per particle}}{\text{surface area of particle}} = \frac{\frac{m_{polymer}}{M_n} * N_{AV}}{4\pi\left(\frac{d}{2}\right)^2}$$

$$m_{polymer} = m_{PGNP} * \frac{wt\ \%_{polymer}}{100} = \\ \frac{m_{silica}}{\frac{wt\ \%_{silica}}{100}} * \frac{wt\ \%_{polymer}}{100} = \frac{4}{3}\pi\left(\frac{d}{2}\right)^3 \rho_{silica} * \frac{wt\ \%_{polymer}}{100 - wt\ \%_{organic}(PGNP)}$$

For anhydride crosslinking, any monomer residue can potentially form a bridge; therefore, the functionality of a PGNP is equal to the number of monomer residues per particles.

$$f_{PGNP} = \text{\# chains per particle} * \frac{M_n}{MW_{monomer}} = \frac{\rho_{PGNP} * SA_{PGNP} * M_n}{MW_{monomer}}$$

SiO$_2$-g-PHMA-20: $f_{PGNP}$~3.6×10$^6$
SiO$_2$-g-PHMA-26: $f_{PGNP}$~2.5×10$^6$
SiO$_2$-g-PHMA-38: $f_{PGNP}$~1.4×10$^6$
SiO$_2$-g-PHMA-48: $f_{PGNP}$~0.9×10$^6$

Composition Calculations of PGNP Composite Films: The remaining mass for aged films was normalized by any mass loss for the 0 hour (dried) sample.

$$\% \text{ Mass} = \frac{Mass_{Final}^{x\,hrs}/Mass_{Initial}^{x\,hrs}}{Mass_{Final}^{0\,hrs}/Mass_{Initial}^{0\,hrs}} \times 100$$

Silica content in aged films was calculated by assuming that all mass loss was from the organic phase.

$$wt \% \ SiO_2 = \frac{\text{Initial } wt \% \ SiO_2}{\text{Remaining } wt \% \ \text{Sample}} \times 100$$

Example 2

The following example describes the synthesis and evaluation of composites comprising polymer grafted $Al_2O_3$ particles.

Figure 21:
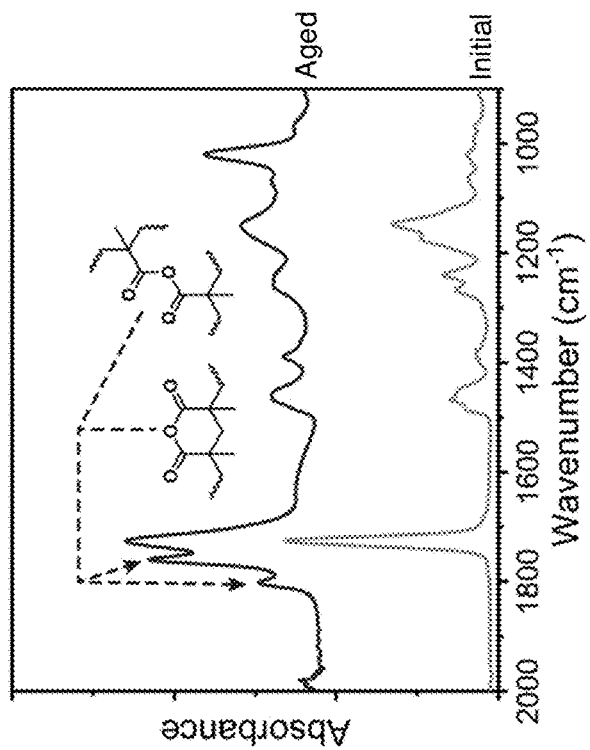
FIG. 21 shows, according to some embodiments, a FTIR of a pre- and post-anneal composite.
Figure 20:
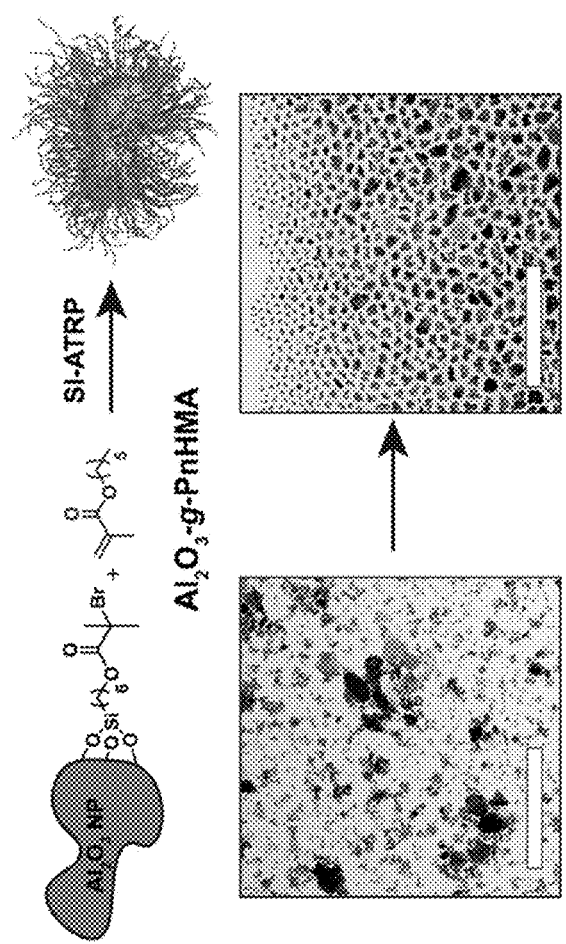
FIG. 20 shows, according to some embodiments, a schematic illustration of polymer grafted particle comprising $Al_2O_3$ and transmission electron microscopy (TEM) images before and after polymer grafting.

Alumina nanoparticles (NPs) were chosen for the synthesis of polymer grafted particles, as alumina has a thermal conductivity two orders of magnitude greater than typical methacrylate polymers, is readily available with a hydroxylated surface suitable for functionalization, and has high strength and stiffness which is beneficial for mechanical reinforcement. Alumina NPs were dispersed in ethanol and ammonia solution and functionalized with a silane containing a bromoisobutyrate ATRP initiator fragment. The particles were then purified by repeated centrifugation and stored in anisole prior to being used for surface-initiated ATRP of PHMA (FIGS. 20-21).

Figure 22:
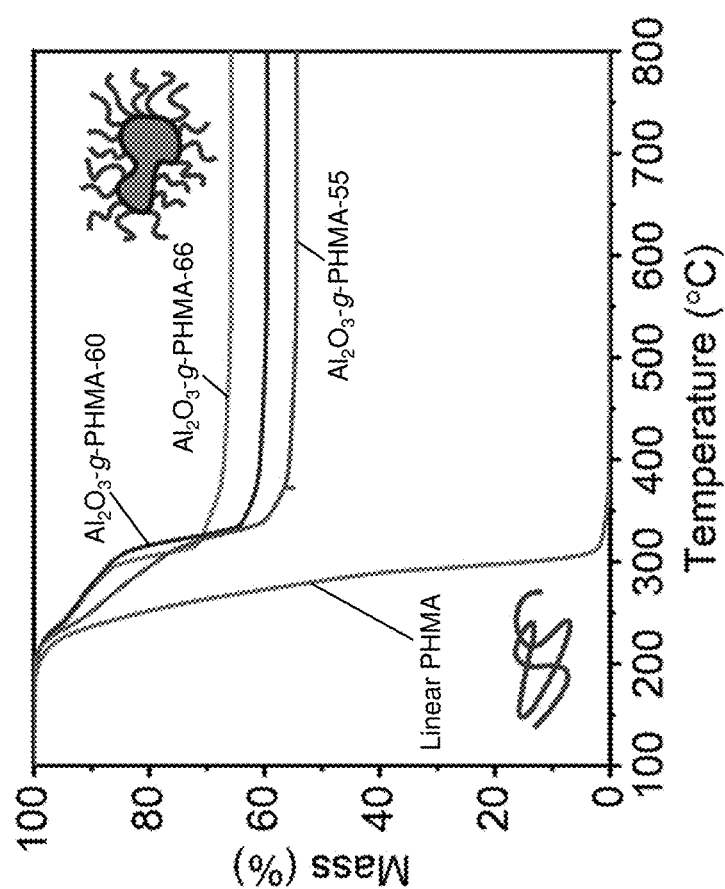
FIG. 22 shows, according to some embodiments, TGA of polymer grafted particles and linear polymers before and after thermal aging.

Prior work with silica NPs indicated that an initial composite with a filler content of 20-30 vol. % provided a good balance of ease of forming without significant deformation during the aging process. As such, an array of three $Al_2O_3$-g-PHMA materials were prepared for chemical, mechanical, and thermal analysis with initial $Al_2O_3$ contents of 55, 60, and 66 wt. % corresponding to approximately 23, 28, and 31 vol. %, respectively. Samples are referred to by their wt. % $Al_2O_3$ (e.g. $Al_2O_3$-g-PHMA-55). The molecular weight distributions of grafted PHMA chains were determined by GPC of chains cleaved from the PGNPs. For $Al_2O_3$-g-PHMA-55, $Al_2O_3$-g-PHMA-60, and $Al_2O_3$-g-PHMA-66, $M_n$ values of 89.2 kDa, 66.4 kDa, and 61.0 kDa were measured, respectively, all with dispersity indices (D) of ~1.3 (see Table 6). TEM imaging of monolayers of $Al_2O_3$PGNPs prepared by drop-casting on water revealed a clear layer of polymer surrounding each particle as well as the obvious dispersity in NP size. Thermogravimetric analysis (TGA) of these materials in air indicated that decomposition leading to mass loss began at approximately 250° C., with more rapid decomposition above 350° C. (FIG. 22). $Al_2O_3$PGNPs were therefore aged in air at 200° C., near the onset of degradation, to allow for control over the aging process.

TABLE 6

PGNP and linear polymer sample composition information.

| Sample | $Al_2O_3$ Content (wt %) | $M_n$ (kDa) | D |
|---|---|---|---|
| $Al_2O_3$-g-PHMA-55 | 54.9 | 89.2 | 1.34 |
| $Al_2O_3$-g-PHMA-60 | 60.1 | 66.4 | 1.30 |
| $Al_2O_3$-g-PHMA-66 | 65.8 | 61.0 | 1.26 |

TABLE 6-continued

PGNP and linear polymer sample composition information.

| Sample | $Al_2O_3$ Content (wt %) | $M_n$ (kDa) | D |
|---|---|---|---|
| $Al_2O_3$-g-PHMA-71 | 71.2 | 41.2 | 1.28 |
| Linear PHMA | 0 | 153 | 1.05 |

Figure 23:
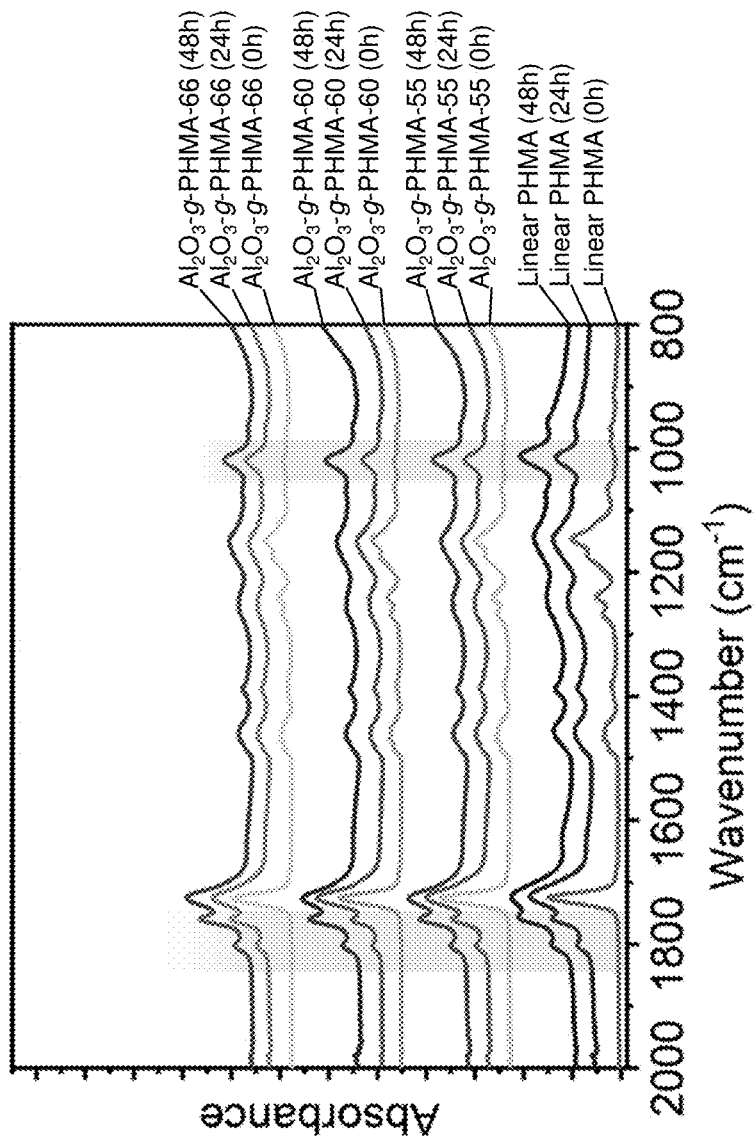
FIG. 23 shows, according to some embodiments, ATR FTIR of polymer grafted particles and linear polymers before and after thermal aging.
Figure 24:
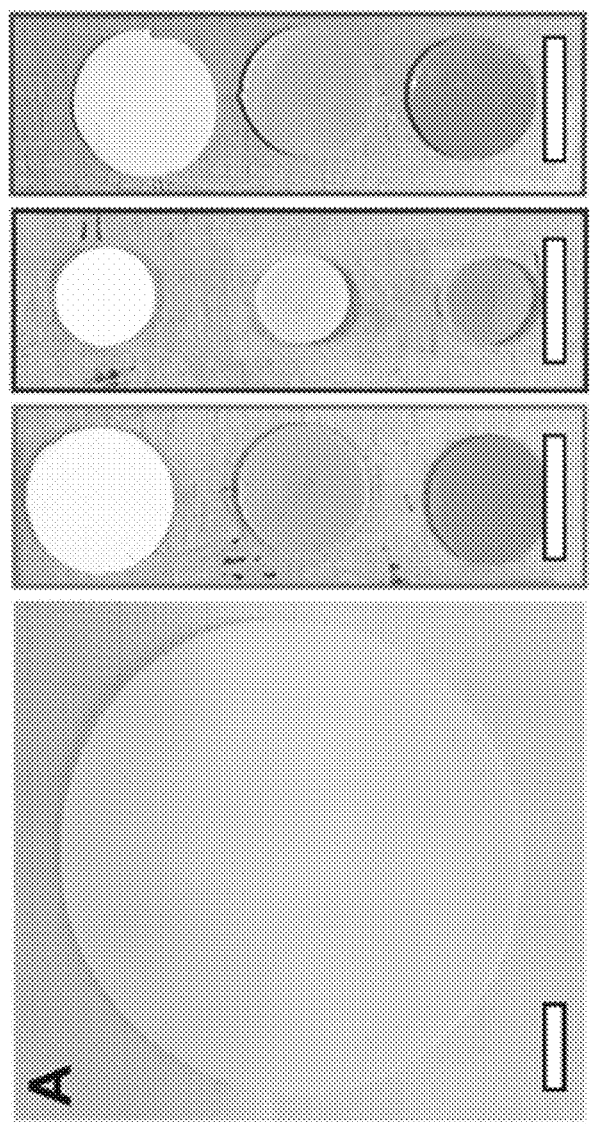
FIG. 24 shows, according to some embodiments, a hot pressed film of a particulate/polymer composite.

PGNPs were hot-pressed at 150° C. between stainless steel plates to a height of ~0.2-0.4 mm to yield flexible, white films (FIG. 24). Transformative aging was performed at 200° C. in ambient air after ramping from 50° C. to 200° C. over ~1 hour under vacuum (~−30 in Hg). The thermal aging of alumina PGNPs was tracked physically by mass loss and chemically by attenuated total reflection (ATR) FTIR. It was found that mass loss during aging progressed more slowly for $Al_2O_3$ materials compared to $SiO_2$ PGNPs, perhaps as a result of the lack of a uniform particle size providing for easier gas diffusion. Therefore, samples were cured for either 24 hours or 48 hours, to achieve a significantly elevated final filler content. Chemical changes in the composite as a result of thermal aging were monitored via FTIR. In all PGNP samples as well as in linear PnHMA, peaks appeared at 1760 and 1800 cm$^{-1}$ attributed to the carbonyl bond stretch of anhydrides and at 1015 cm$^{-1}$ corresponding to the stretching of an anhydride bond and indicating the progression of the aging process (FIG. 23). The height of the anhydride peaks increased from 24 to 48 hours relative to the 1725 cm$^{-1}$ peak from the carbonyl stretch of the hexyl methacrylate ester for all samples, demonstrating that the anhydride content of the remaining polymer increased with increased aging time. Interestingly, the absorbance ratio for the 1800 and 1760 cm$^{-1}$ peaks remained relatively constant at ~30-40% across all PGNP and linear samples and aging time. This indicates that the relative amounts of cyclic and non-cyclic anhydrides remains approximately constant, while the total relative anhydride content increases with continued aging (Table 7). Upon aging, all materials were found to transition from being completely soluble in MEK (a good solvent for many polymers) to completely insoluble after over a week of agitation, attesting that the formation of anhydride linkages during thermal aging yields a coherent, crosslinked composite.

TABLE 7

Peak height ratios from ATR FTIR comparing anhydride peaks (1800, 1760 cm$^{-1}$) and ester peak (1760 cm$^{-1}$) at different aging times.
FTIR Peak Height Ratios

| | | Peak Positions (cm$^{-1}$) | | | |
|---|---|---|---|---|---|
| Material | Aging Time | 1800/ 1725 | 1760/ 1725 | (1800 + 1760)/ 1725 | 1800/ 1760 |
| Linear PHMA | 24 h | 17% | 43% | 60% | 40% |
| | 48 h | 25% | 65% | 90% | 38% |
| $Al_2O_3$-g-PHMA-55 | 24 h | 15% | 37% | 52% | 39% |
| | 48 h | 21% | 63% | 85% | 33% |
| $Al_2O_3$-g-PHMA-60 | 24 h | 11% | 27% | 38% | 40% |
| | 48 h | 23% | 71% | 94% | 32% |
| $Al_2O_3$-g-PHMA-66 | 24 h | 16% | 48% | 64% | 34% |
| | 48 h | 20% | 63% | 83% | 32% |

Figure 25:
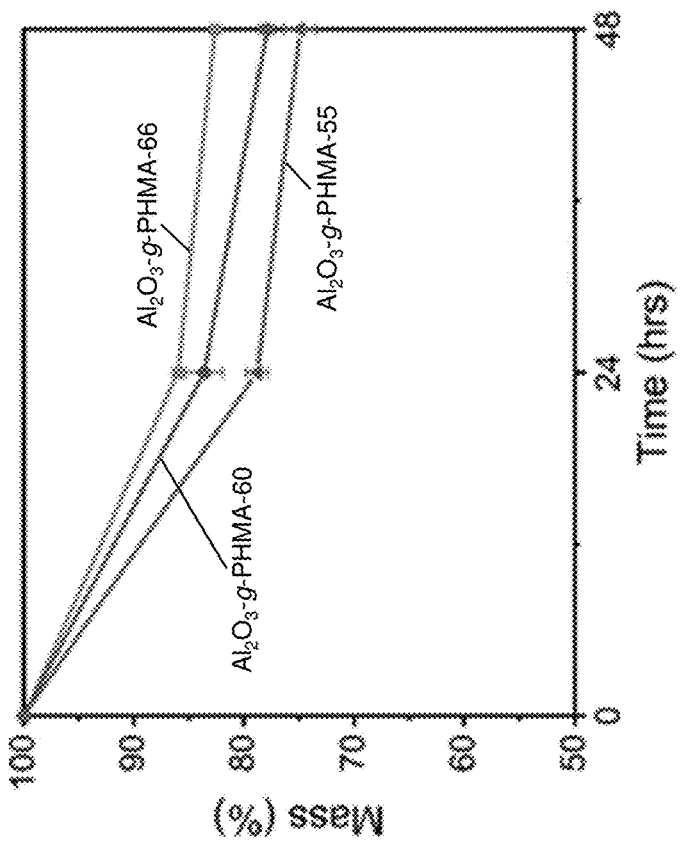
FIG. 25 shows, according to some embodiments, the mass loss in $Al_2O_3$ polymer grafted particles as a function of the time of thermally aging.
Figure 26:
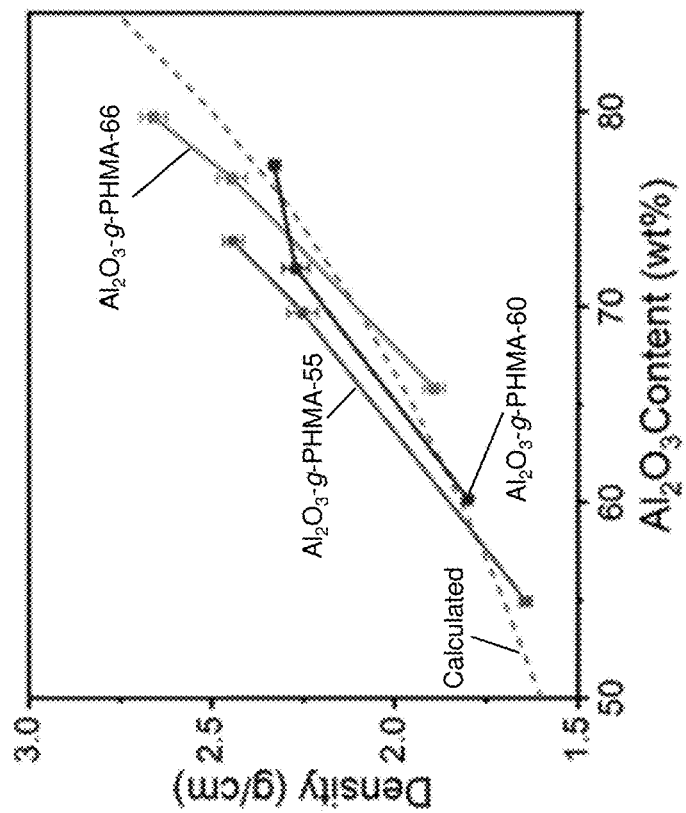
FIG. 26 shows, according to some embodiments, the density of $Al_2O_3$ polymer grafted particles as a function of alumina content.

During the aging process, as a result of oxidation of residual copper from ATRP, samples gradually transition from a pure white color to a caramel color (FIG. 24). The mass loss from 24 hours to 48 hours was significantly reduced compared to the initial 24 hour period (~20-35% of mass loss in the initial 24 hrs), indicating a similar reduction in rate of decomposition over time as was found for $SiO_2$ NP PGNPs (FIG. 25). The diameters and thicknesses of the circular samples also diminished during aging, resulting in a significant increase in sample density (FIG. 26, Table 8). The increase of aged sample densities above the predicted value based on $Al_2O_3$ content may indicate an increase in the density of the polymer phase of the composite, approximate measurements of linear PnHMA after aging for 24 hours and 48 hours yielded values of 1.14 g/cm$^3$ and 1.25 g/cm$^3$ based on film thickness measurements via profilometry. For reference, PnHMA has a density of 1.0 g/cm$^3$ whereas poly (methacrylic acid) has a density of ~1.3 g/cm$^3$ without the ester side chains.

TABLE 8

Heat capacities and densities of linear PnHMA and alumina PGNPs measured in this work.

| Sample | Aging Time (h) | $C_P$(J/gK) | Density (g/cm$^3$) |
|---|---|---|---|
| $Al_2O_3$-g-PHMA-55 | 0 | 1.42 | 1.64 ± 0.02 |
|  | 24 | 1.13 | 2.25 ± 0.04 |
|  | 48 | 1.03 | 2.44 ± 0.03 |
| $Al_2O_3$-g-PHMA-60 | 0 | 1.32 | 1.80 ± 0.01 |
|  | 24 | 1.18 | 2.27 ± 0.04 |
|  | 48 | 1.05 | 2.33 ± 0.01 |
| $Al_2O_3$-g-PHMA-66 | 0 | 1.25 | 1.89 ± 0.03 |
|  | 24 | 1.02 | 2.44 ± 0.04 |
|  | 48 | 1.01 | 2.66 ± 0.04 |
| $Al_2O_3$-g-PHMA-71 | 0 | — | 2.16 ± 0.02 |
|  | 24 | — | 2.59 ± 0.03 |
|  | 28 | — | 2.73 ± 0.02 |
| Linear PnHMA | 0 | 2.17 | 1.01* |
|  | 24 | 1.72 | 1.14 ± 0.07 |
|  | 48 | 1.69 | 1.25 ± 0.14 |

*From data sheet for commercially available material.

The morphology of the hot-pressed composite films was assessed before and after aging via SEM of both the pressed film faces and of film cross-sections after cutting with a razor blade. Before aging, it was difficult to view $Al_2O_3$ particles through the grafted polymer; however, after aging, a clear layer of closely arrayed NPs of varying size is visible for all samples. Generally, all sample surfaces appeared flat and free from voids or defects, indicating that the material remained dense during curing. However, there were some visible gaps between particles for $Al_2O_3$-g-PHMA-66 after 48 hours of aging, which was the highest alumina content sample investigated. Images of cross-sections revealed a dense arrangement of particles through the entire film thicknesses prior to aging. The cross-sectional surfaces of aged films appeared rougher, although this was largely attributed to the fracture of the material when cut. The filler particles appeared to still be well adhered to one another after aging, with no large porosity or loose, dislodged particles visible after fracture, but it is difficult to conclude whether or not small interstitial gaps exist between particles given the roughness of the surface and dispersity in particle size. It is noted that, when cut with a razor, the samples only broke at the point of the cut, and did not fracture or crack in other directions, attesting that the composites remained coherent after aging.

Changes to mechanical properties upon aging were evaluated by nanoindentation, using a depth-controlled approach to provide similar deformation rates despite the drastic changes in properties upon aging.

Figure 27B:
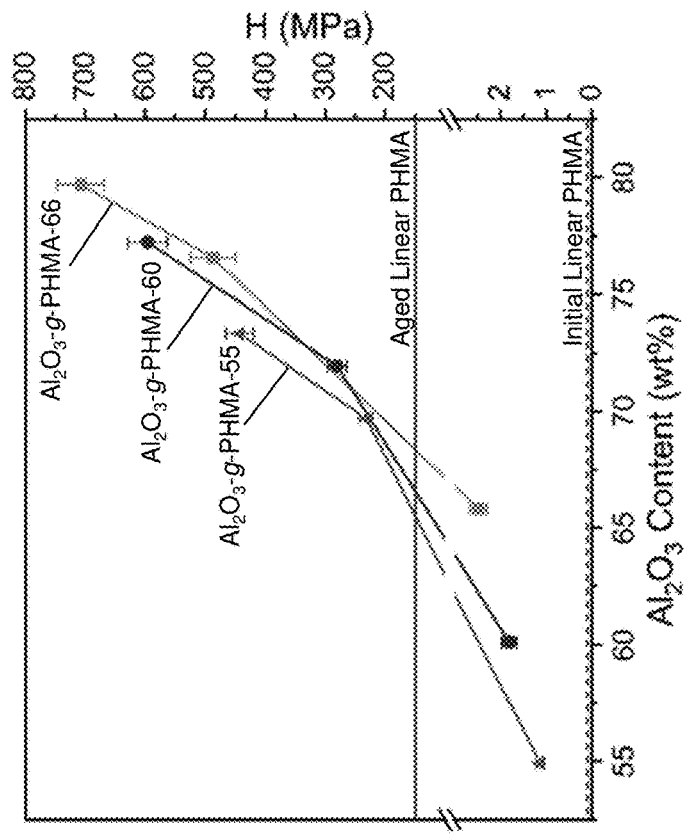
FIG. 27B shows, according to some embodiments, the hardness as a function of time of thermally aging.
Figure 27A:
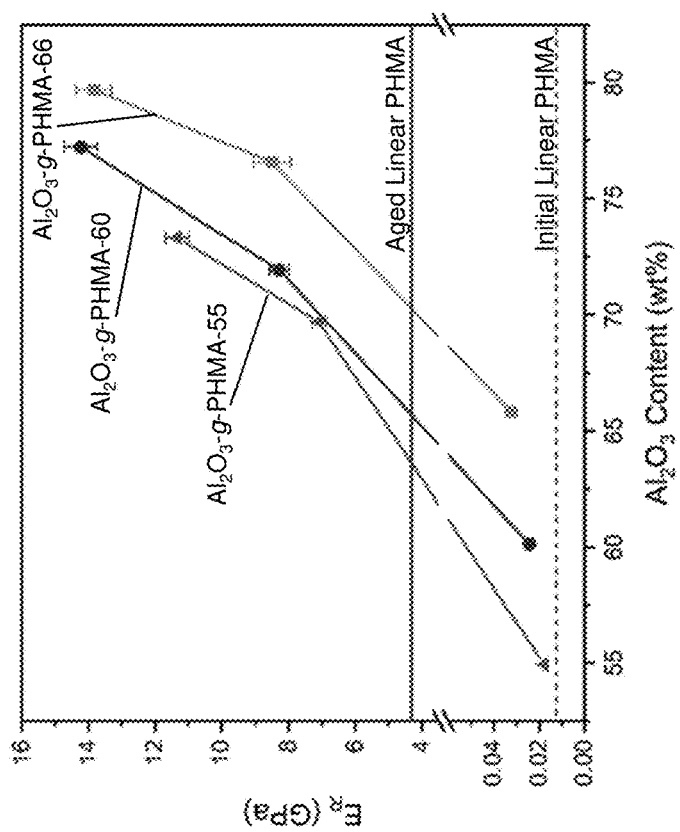
FIG. 27A shows, according to some embodiments, the modulus of particulate/polymer composites as a function of time of thermally aging.

Depth controlled nanoindentation (750 nm, 36 indents per sample) was used to measure the hardness and reduced modulus of each PGNP sample before and after aging (FIGS. 27A-27B). In addition, indentation was performed on samples of linear PnHMA cured on top of a silicon wafer for comparison. The linear samples exhibited much more mass loss than the PGNPs (19% and 15% mass remaining after aging for 24 hours and 48 hours, respectively). The hardness and stiffness of linear PnHMA was nearly identical for 24 hour and 48 hour aging, and their average values were used for comparison.

Looking at stiffness, interestingly, the moduli of $Al_2O_3$-g-PHMA-60 and $Al_2O_3$-g-PHMA-66 were the same within error at both 24 hour and 48 hour aging timepoints, while the modulus of $Al_2O_3$-g-PHMA-55 was slightly lower after 24 hours and significantly lower after 48 hours of aging. These results indicated that the stiffness of the composite, at least at higher filler loadings, was more dependent on the aging time and, therefore, on the properties of the polymer component than on the level of filler content. This is reasonable given the dispersed nature of the filler and the vast difference in stiffness of matrix and filler phases (E ~409 GPa, H ~28 GPa for α $Al_2O_3$). In contrast, the hardness values of the aged composites increased roughly linearly with wt. % alumina across both 24 hour and 48 hour aged conditions. Interestingly, this contrast hints that the production of rigid composites by thermal aging of PGNPs could provide a means to separately tune stiffness and hardness. For instance, $Al_2O_3$-g-PHMA-60 aged for 48 hours and $Al_2O_3$-g-PHMA-66 aged for 24 hours both consist of ~77 wt. % $Al_2O_3$ and have similar hardness values of 596±33 MPa and 487±37 MPa but starkly different moduli of 14.2±0.5 GPa and 8.5±0.6 GPa, respectively. Given that hardness is correlated to a material's strength, this implies that it may be possible to design high strength composites with a tailored range of stiffnesses to suit the particular application.

Compared to previous work with lab synthesized nanoparticles, the use of commercially available filler materials allowed for larger scale PGNP production. In order to demonstrate that these aged and highly-filled composites are mechanically robust as a macroscopic material, an additional material with a similarly high filler content was synthesized at a larger scale ($Al_2O_3$-g-PHMA-71, ~1.6 g yield) in order to prepare rectangular film specimens for quasi-static tensile testing. Three samples each of un-aged, 24 hour aged, and 48 hour aged composite films made from $Al_2O_3$-g-PHMA-71 were strained at a rate of 10%/min (FIGS. 28A-28B). The un-aged composite was found to be soft and extremely soft and ductile, and the samples did not fail at up to 100% strain wherein the tests were terminated. In contrast, the aged composites were significantly stronger and stiffer. The average composite strength (engineering value) was 43.8±0.6 MPa and 61.0±0.5 MPa after 24 hours and 48 hours of aging, respectively (Table 9). For comparison, the ultimate tensile strength of unfilled commercial PMMA sheet is ~65 MPa when evaluated at a similar strain rate. Unfortunately, it was not possible to directly compare unfilled PnHMA after thermal aging, as the unfilled polymer freely flows and does not maintain its shape at the aging temperature. However, the fact that the strength of the composite is roughly equivalent to widely used acrylic despite over 50 vol. % nanofiller content indicates that thermal aging of bulk PGNP materials can yield mechanically robust composites. The average moduli of the aged composites were 5.0±0.2 GPa and 9.4±1.0 GPa after 24 hours and 48 hours, respectively, which is quite high compared to typical unfilled commercial polymer materials (e.g., PMMA ~3 GPa). It is noted that these modulus values are substantially lower than the reduced moduli of the other aged composites as determined by nanoindentation, which is attributed to the compressive nature and much higher local strains in indentation measurements. In summary, tensile testing of bulk PGNP nanocomposites indicated that thermal aging and crosslinking of PGNPs can yield macroscopic composites that are both strong and stiff.

TABLE 9

Ultimate tensile strength (UTS), elastic modulus (E), and failure strain of Al$_2$O$_3$-g-PHMA-71 determined by quasi-static tensile

|  | 24 h | | | 48 h | | |
| --- | --- | --- | --- | --- | --- | --- |
|  | UTS (MPa) | E (GPa) | Failure Strain (%) | UTS (MPa) | E (GPa) | Failure Strain (%) |
| 1 | 44.6 | 4.9 | 1.7 | 61.3 | 8.0 | 1.2 |
| 2 | 43.6 | 4.7 | 1.6 | 60.3 | 9.8 | 0.9 |
| 3 | 43.2 | 5.2 | 1.8 | 61.4 | 10.3 | 1.0 |
| Mean | 43.8 | 5.0 | 1.7 | 61.0 | 9.4 | 1.0 |
| Std Dev | 0.6 | 0.2 | 0.1 | 0.5 | 1.0 | 0.1 |

Figure 29:
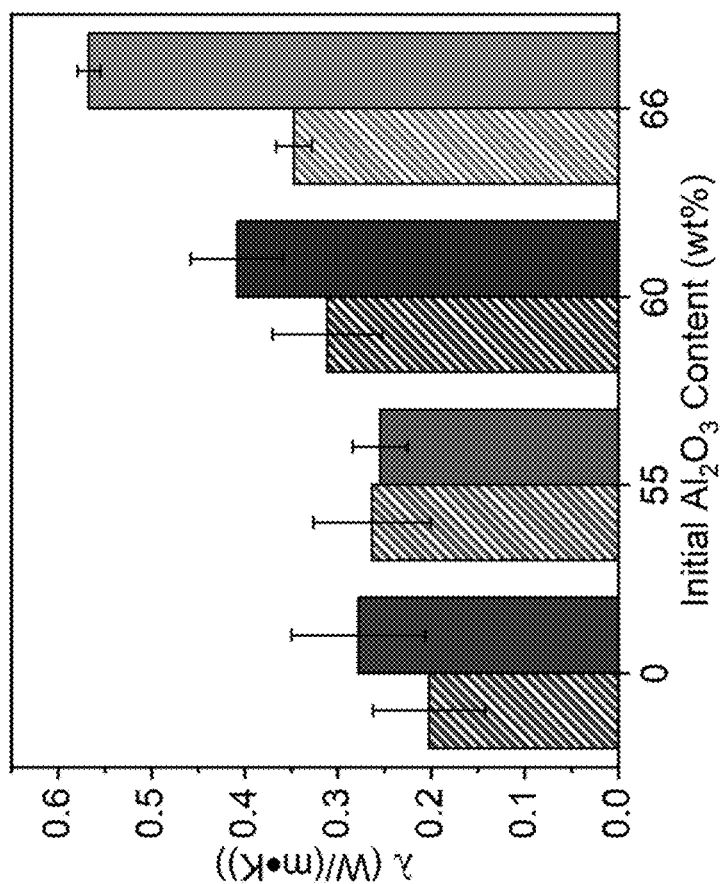
FIG. 29 shows, according to some embodiments, the thermal conductivity of polymer grafted particles compared to linear polymers.

The thermal diffusivity of the composites was evaluated via Frequency Domain Thermoreflectance (FDTR) which, combined with density and heat capacity determined by Differential Scanning calorimetry (DSC) (see Table 9), was used to calculate thermal conductivity. It was found that soft, uncured samples were not-suitable for FDTR measurement, so values are presented only for aged linear PnHMA and Al$_2$O$_3$-g-PHMA samples (FIG. 29); at least three spots were measured per sample, with more highly filled samples providing more consistent results. Al$_2$O$_3$-g-PHMA-66 aged composite samples achieved a 72% and 104% enhancement of thermal conductivity compared to the corresponding linear polymer sample after 24 hours and 48 hours of aging, respectively.

Based on group contributions, the thermal conductivity of un-aged linear PnHMA was calculated to be ~0.16 W/mK, and thermal aging appeared to increase the conductivity of PnHMA as anhydrides are formed. For a particulate filled polymer, thermal conductivity can be estimated by the series rule of mixtures based on the relative volume fractions of matrix and filler. When the conductivity of the filler is much higher than that of the matrix ($\lambda$ ~30 W/mk for $\alpha$ Al$_2$O$_3$), the thermal conductivity of the composite is primarily limited by the maximum achievable filler fraction (Equation 1, where $\lambda$ is thermal conductivity and $\phi$ is volume fraction; subscripts c, f, and m indicate composite, filler, and matrix, respectively).

$$\lambda_c = \frac{1}{\frac{\phi_f}{\lambda_f} + \frac{1-\phi_f}{\lambda_m}} \approx \frac{\lambda_m}{1-\phi_f} \quad \text{(Equation 1)}$$

Thus, the highest thermal conductivity for a composite with a distributed filler can be achieved by maximizing the filler content. This simplification also neglects any interfacial resistance between filler and matrix, which should be minimized by the covalent bonding of the two phases. Using the measured densities of Al$_2$O$_3$PGNP samples and the reported density of alumina (3.97 g/cm$^3$), the volume fractions of Al$_2$O$_3$NPs in aged composites can be estimated (Table 10). Together with the measured thermal conductivity of aged PnHMA, the thermal conductivity of the composites can be calculated by Equation 4.1 (Table 10). For Al$_2$O$_3$-g-PHMA-66, conductivities of 0.38 and 0.60 W/mK were determined, which agree well with the measured values of 0.35 and 0.57 W/mK. While the thermal conductivity values of the composites are still lower than inorganic and metallic materials, they are higher than most common polymer materials, and this work demonstrates that the high filler content achievable by aging bulk PGNP composites can translate into improved functionality without compromising mechanical properties.

While previous work has demonstrated that PGNPs made with lab-grown nanoparticles can be thermally aged to allow for the synthesis of hilly-filled, rigid nanocomposites, this work presents a first step towards generalizing the aging method to any filler material, selected to add or augment a particular property. By grafting a low $T_g$ polymer from commercially available alumina particles and aging the resulting PGNPs, gram scale nanocomposites with up to ~50 vol. % filler were prepared. The aging process resulted in dramatic increases in the composite mechanical performance as a result of chemical conversion and crosslinking of the composite, with a concomitant increase in filler content. Furthermore, thermal conductivity measurements demonstrated that the ability to formulate such highly filled composites can result in increased functionality based on the particular filler particles selected. Meanwhile, the initial "green" composite can be easily and rapidly formed into bulk components at elevated temperatures, allowing the facile fabrication of functional components. In cases where electrical insulation is not required, it may be possible to significantly enhance the thermal conductivity of these composites by doping the polymer phase with conductive carbons. Future work will focus on extending this processing concept to commercial polymers and grafting methods to further demonstrate scalability and practicality, and properties which more directly benefit from elevated filler content, such as refractive index and permittivity, will be investigated to show the general utility of this approach to nanocomposite synthesis.

TABLE 10

Alumina content in aged samples calculated based on sample mass losses.

| Sample | Aging Time (h) | Al$_2$O$_3$ Content (wt %) | Al$_2$O$_3$ Content* (vol %) | Calculated $\lambda$** (W/mK) |
| --- | --- | --- | --- | --- |
| Al$_2$O$_3$-g-PHMA-55 | 0 | 54.9 | 22.7 | — |
|  | 24 | 69.7 | 39.5 | 0.33 |
|  | 48 | 73.3 | 45.1 | 0.51 |
| Al$_2$O$_3$-g-PHMA-60 | 0 | 60.1 | 27.5 | — |
|  | 24 | 71.9 | 38.6 | 0.33 |
|  | 48 | 77.2 | 42.9 | 0.49 |
| Al$_2$O$_3$-g-PHMA-66 | 0 | 65.8 | 31.4 | — |
|  | 24 | 76.6 | 47.1 | 0.38 |
|  | 48 | 79.7 | 53.4 | 0.60 |
| Al$_2$O$_3$-g-PHMA-71 | 0 | 71.2 | 38.8 | — |
|  | 24 | 78.7 | 51.5 | — |
|  | 48 | 81.6 | 56.0 | — |

*Volumetric content estimated from measured sample densities.
**Calculated by series rule-of-mixtures using measured $\lambda$ of aged linear polymers and reported $\lambda$ of $\alpha$ Al$_2$O$_3$.

All materials were purchased from Fisher or Alfa Asear and used as received. n-Hexyl methacrylate was filtered through a column of basic alumina to remove the inhibitor and stored in a freezer prior to use. 99.99% α-alumina particles (nominal diameter of 30 nm) were purchased from US Nano, Inc. as a 20 wt. % dispersion in water.

Particle Functionalization: Alumina NPs were dispersed into ethanol by three cycles of centrifugation and redispersion. Ammonia solution (28%) was added to increase the ammonia concentration to 1 M, and the mixture was heated to 40° C. 2-Bromo methyl)propionyloxyhexyltriethoxysilane (BHE) was added in a ten-fold excess assuming a maximum coverage of $1/nm^2$ and based on the assumption of spherical particles. After stirring overnight, particles were purified by 3 cycles of centrifugation and redispersion in ethanol followed by 3 cycles of centrifugation and redispersion in anisole. BHE functionalized $Al_2O_3$NPs were stored as a stock solution (8.6 wt. %) and briefly dispersed by shaking and sonication prior to each use.

SI-ATRP: Alumina PGNPs were prepared by SI ARGET ATRP. In a 50 mL Schlenk flask, 11 mL of $Al_2O_3$-BHE solution in anisole (8.6 wt. %), 11.6 mL of n-hexyl methacrylate (59 mmol), 12.3 µL of PMDETA (59 µmol), 132 µL of a 20 mg/mL solution of $CuBr_2$ in DMF (12 µmol), and 1.0 mL of anisole (to achieve a 1:1 vol./vol. ratio of hexyl methacrylate/anisole) were combined. The flask was sealed, and the reaction mixture was degassed by 5 freeze-pump-thaw cycles (~100 mTorr). The flask was back filled with nitrogen and thawed. Separately, a solution of 33.8 mg/mL of Sn(II) 2-ethyl hexanoate in anisole was prepared and degassed by bubbling with nitrogen for ~5 minutes. To initiate polymerization, a 0.3 mL aliquot of the Sn solution (24 µmol) was injected via nitrogen purged syringe using the side-arm of the flask as an airlock (purged by nitrogen flow), and the flask was lowered into an oil back at 60° C. Reaction progress was monitored by removing aliquots via nitrogen-purged syringe and measuring the wt. % solids of the reaction mixture. At a desired conversion, the reaction was terminated by briefly cooling in liquid nitrogen and opening to air. The reaction mixture was then immediately precipitated into methanol. The precipitate was pelleted by centrifugation and dispersed in MEK. Particles were further purified by 3 cycles of centrifugation and redispersion in MEK. Finally, the PGNPs were again precipitated into methanol and dried under vacuum (<100 mTorr) to obtain a white solid.

Normal ATRP: Linear PnHMA was prepared by normal ATRP. In a 50 mL Schlenk flask, 4.0 µL of ethyl bromoisobutyrate (27 µmol), 13.4 mL of n-hexyl methacrylate (68 mmol), 8.6 µL of HMTETA (31 µmol), 15.2 µL of 20 mg/mL $CuBr_2$ in DMF (1.4 µmol), and 13.4 mL of anisole (1:1 vol./vol. hexyl methacrylate/anisole) were combined. The flask was sealed and degassed by five free-pump-thaw cycles (~100 mTorr). On the final freeze, the flask was opened under heavy $N_2$ purge flow, and 3.9 mg of CuBr (27 µmol) was quickly added before resealing the flask. While frozen, the headspace was cycled between vacuum and $N_2$ three times, ending under $N_2$ backfill. The flask was then thawed, and the polymerization was initiated by immersing the flask in a 50° C. oil bath. Reaction progress was monitored via $^1$H-NMR of the alkene peaks relative to the anisole methoxy group peaks. At the desired conversion, the reaction was terminated by cooling the flask briefly with liquid nitrogen and opening the flask to air. The solution was immediately precipitated into methanol. The precipitate was pelleted via centrifugation and dissolved in MEK. Precipitation was repeated two additional times. The final precipitate was dried under vacuum to obtain a clear, colorless tacky solid.

Film pressing and curing: To produce films of $Al_2O_3$-g-PHMA, ~1 g of PGNPs were pressed at 150° C. between clean stainless-steel plates after warming for 1-2 minutes. Films were pressed to a maximum load of ~1000 kg using a 0.2 mm ring shim to set film thickness. The material was cooled to room temperature in the press in ~10 minutes before removing to obtain a thin, flexible, white film. Small samples for mechanical, thermal, and chemical analysis were prepared using 4 mm and 6 mm diameter biopsy punches. Samples were aged on stainless steel plates coated with an adhesive PTFE film in a vacuum oven. Temperature was ramped from 50° C. to 200° C. over 1 hour while under vacuum (-30 in Hg). Vacuum was then released, and aging progressed at 200° C. under ambient air with both inlet and outlet valves fully opened. Unaged control samples were removed after the ramp step. Sample diameters were measured with digital calibers, and the thickness of samples were measured with a calibrated film thickness gauge or calibrated micrometer with ⅛" tips for initial and aged samples, respectively. To avoid influence of the slight curvature of aged samples, thickness was measured at the sample center, which was the flattest region. Sample mass was measured with an analytical balance.

TEM: PGNP monolayers were prepared by drop-casting a 1 mg/mL solution in toluene on top of water in a covered petri-dish. After drying, a carbon/formvar-coated TEM grid (200 mesh) was used to scoop a portion of monolayer from the surface of the water. NP TEM samples were prepared by drop-casting a solution of particles in ethanol directly onto a TEM grid. Images were taken using an FEI Tecnai (G2 Spirit TWIN) digital TEM at an accelerating voltage of 120 kV.

TGA: TGA measurements were conducted on a TA Instruments Discovery TGA using high-temperature platinum pans. For composition determination, measurement was conducted under nitrogen gas with a 15-minute hold at 150° C. to remove residual solvent before heating to 800° C. at a rate of 15° C./min. For thin-film decomposition study, measurement was conducted under air with a 30-minute hold at 100° C. before heating to 800° C. at a rate of 5° C./min.

GPC: Polymer was cleaved from PGNPs for analysis by stirring overnight in a 2:1 solution of THF/HF. The solution was neutralized with ammonia solution (28%) while frozen with liquid nitrogen. The organic layer was extracted, dried over magnesium sulfate, and filtered through a 0.2 µm PTFE syringe filter. Samples from PGNPs and linear polymer were analyzed using an Agilent 1260 Infinity II system with a multidetector suite equipped with two sequential Agilent ResiPore columns using a THF eluent at 40° C. with a flow rate of 1 mL/min. Absolute molecular weights were determined using refractive index and right-angle light scattering (RALS) detectors with an incremental refractive index (dn/dc) of 0.071, as measured with a linear polymer sample. It is noted that most PGNP samples exhibited a high MW shoulder which was attributed to either incomplete etching or intermolecular termination during polymer growth.

FTIR: ATR FTIR measurements were taken using a Nicolet iS50 FTIR spectrometer with built-in ATR stage using a diamond window, 128 scans, and automatic baseline correction. Peak heights to evaluate changes in peak ratios were determined by free fitting of three Voigt peaks between 1900 and 1600 $cm^{-1}$ with linear baseline subtraction in Origin.

DSC: DSC measurement was conducted using a TA Instruments Discovery DSC and aluminum pans. Samples were heated from -50° C. to 125° C. at a rate of 10° C./min with a 1-minute hold at each end over a total of three cycles. Heat capacity was determined from the final heating step at 25° C., and measurements were corrected by subtracting the heat flow for an empty pan under identical conditions measured at the same time.

FDTR: Thermal conductivity was measured using the FDTR methods developed in the literature. In preparation for FDTR, a DC-magnetron sputtering device (Lecia EM ACE600) was used to coat specimens an 80 nm layer of gold that served as an optical transducer. The FDTR platform consists of two continuous wave lasers for the pump and probe with wavelengths of 488 nm and 532 nm, respectively. The pump was used to dynamically heat the sample with a sinusoidally modulated frequency of ~5 kHz to 50 MHz, and the probe was used to detect the corresponding change in surface temperature by exploiting the thermoreflectance effect of the gold transducer layer. The diameters ($1/e^2$) of the pump and probe laser spots were 13 µm and 12 µm, respectively. The power of the reflected probe beam was measured with a balanced detector and radio-frequency lock-in amplifier, using a reference beam spit from the laser source to minimize any noise from power fluctuation. Before sample measurement, the phase of the pump beam at each modulation frequency was determined. Then, the phase lag between the sinusoidal heating and change in surface temperature was recorded, and the phase data was fitted with a two-layer analytical model using thermal conductivity as a fitting parameter. A minimum of three spots were evaluated on each sample.

SEM: Cross-sectional sample were prepared by cutting film specimens with a clean razor blade. All specimens were coated with ~8 nm of gold using a Quorum Technologies SC 7640 sputter coater. Images were taken with a Zeiss Sigma 300 VP field emission SEM using a 10 kV voltage and an in-lens secondary electron detector.

Figure 30B:
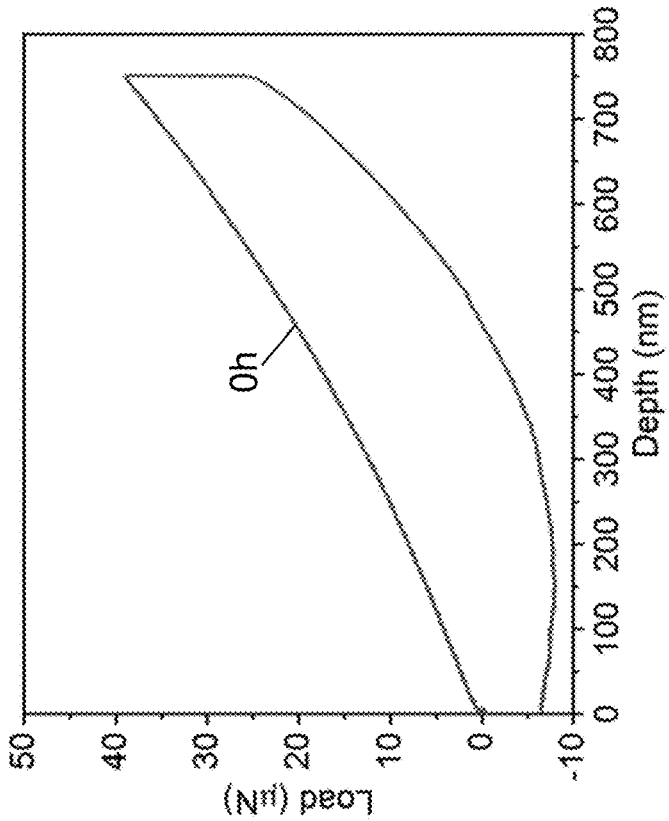
FIGS. 30A-30B show, according to some embodiments, depth-load curves from nanoindentation of polymer grafted particles.
Figure 30A:
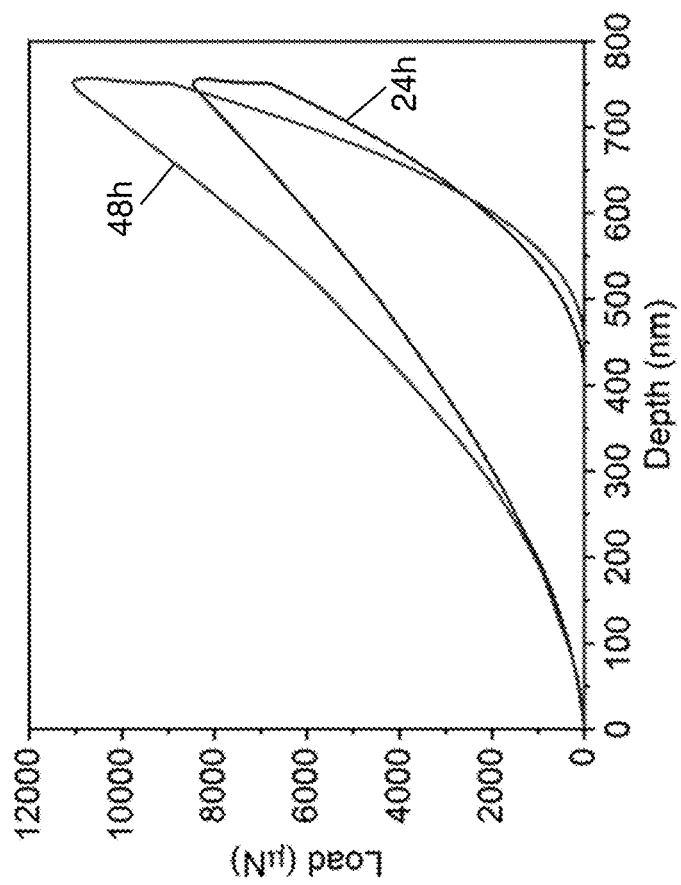

Nanoindentation: Nanoindentation measurements were conducted on a Hysitron Triboindenter using a diamond Berkovich tip whose area function had been determined by a series of indentations in fused quartz. For each sample, a 6×6 array of indents was made with a 50 µm spacing. Indents were made under depth control up to 750 nm at a loading/unloading rate of 50 nm/sec with a 30 second hold for stress relaxation. Hardness and reduced modulus were calculated by Oliver-Pharr analysis of the load-depth data in MATLAB by fitting both relaxation and withdrawal segments to a power function and using the rate-jump method between the relaxation and withdrawal steps. A plastic contact assumption was found to be appropriate for all indents. A two-coefficient fit was used for the tip area function to avoid extrapolation errors given the high depth, with a fixed c0 value of 24.5 as appropriate for a Berkovich geometry. Measurements were conducted in flat specimen areas free from indents. A slight surface curvature was apparent in linear polymer comparison samples. Example depth-load traces for $Al_2O_3$-g-PHMA-61 are shown in FIGS. 30A-30B.

Tensile Testing: Tensile tests were performed using rectangular (~30 mm×2 mm) thin film specimens that were cut from pressed material prior to aging. To minimize any sample curvature as a result of aging, tensile samples were flipped ~halfway through the aging time. Specimens were tested on an Instron 8848 MicroTester with an initial grip separation of 15 mm and plastic lined jaws tightened with 4 screws on each grip at a torque of 0.1 Nm at a strain rate of 1.5 mm/min. For uncured specimens, the test was limited to a maximum strain of 100%. A 2 kN load cell was used for aged samples, and a 50 N load cell was used for un-aged samples. Stress and strain are engineering values. Modulus was determined by a linear fit between 0.1 and 0.2% strain.

PGNP and Linear Polymer Sample Composition: $Al_2O_3$ content was measured via TGA, and polymer number average molecular weight ($M_n$) and dispersity (D) were determined via GPC of polymer chains cleaved from the PGNPs.

Calculation of Specific Heat Capacity (CP): Heat capacity was calculated from DSC data based on the heat flow (q) during the final heating run at a heating rate (ST) of 10° C./min. The heat flow for a consistent blank pan that was analyzed on the same day was subtracted to account for instrument error.

$$C_p = \left(\frac{J}{gK}\right) = (q_{Sample} - q_{blank})/(m_{sample} * \delta T)$$

Sample Composition: Sample alumina content (wt. %) was calculated based on the initial inorganic content as determined by TGA and the remaining sample mass fraction (f) after aging. Mass fractions were the average measurement from three samples.

$$wt\ \%_{Aged} = \frac{wt\ \%_{Initial}}{f_{Aged}}$$

Sample composition by volume was calculated using the wt. % of alumina and the measured density of the composite while assuming an alumina density of 3.97 $g/cm^3$.

$$vol\ \%_{Al_2O_3} = \frac{\frac{wt\ \%_{Al_2O_3}}{100}}{3.97\frac{g}{cm^3}} * \frac{1}{\rho_{composite}} * 100$$

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A composition comprising:
a particulate/polymer composite comprising a plurality of particles, wherein a first particle of the plurality of particles has a surface to which polymer chains are grafted, wherein at least some of the polymer chains grafted to the surface of the first particle are covalently linked to a polymer chain grafted to a second particle of the plurality of particles,
wherein the composition comprises between greater than or equal to 0.1 wt. % and less than or equal to 30 wt. % of material other than the particulate/polymer composite, the plurality of particles comprise an oxide, a metal, a polymer, a semiconductor, a carbon-based material, and/or a metal-organic framework (MOF), and the first particle and/or second particle have an average maximum dimension between greater than or equal to 5 nm and less than or equal to 10 microns, and the composition has a glass transition temperature of at least −15° C.

2. The composition of claim 1, wherein at least 50% of the linkages between the polymer chains grafted to the first particle and the polymer chain grafted to the second particle are covalent linkages.

3. The composition of claim 1, comprising a wt. % ratio of particulate to polymer of at least 1:4.

4. The composition of claim 1, wherein the polymer chains comprise a polymer.

5. The composition of claim 1, wherein the composition has a glass transition temperature of at least 80° C.

6. The composition of claim 1, wherein the polymer chains comprise a block copolymer.

7. The composition of claim 1, wherein the composition also has a Modulus of at least 0.1 GPa.

8. The composition of claim 1, wherein the composition also has a hardness of at least 25 MPa.

9. The composition of claim 1, wherein the composition comprises between greater than or equal to 0.1 wt. % and less than or equal to 20 wt. % of material other than the particulate/polymer composite.

10. The composition of claim 1, wherein the composition comprises between greater than or equal to 0.1 wt. % and less than or equal to 10 wt. % of material other than the particulate/polymer composite.

11. The composition of claim 1, wherein the composition comprises between greater than or equal to 0.1 wt. % and less than or equal to 1 wt. % of material other than the particulate/polymer composite.

12. The composition of claim 1, wherein the first particle and the second particle comprise a same material.

13. The composition of claim 1, wherein the first particle and the second particle comprise silicon dioxide ($SiO_2$).

* * * * *